United States Patent
Crichlow

(12) 
(10) Patent No.: US 11,339,611 B2
(45) Date of Patent: May 24, 2022

(54) DEEP HUMAN-MADE CAVERN CONSTRUCTION

(71) Applicant: Henry Crichlow, Norman, OK (US)

(72) Inventor: Henry Crichlow, Norman, OK (US)

(*) Notice: Subject to any disclaimer, the term of this patent is extended or adjusted under 35 U.S.C. 154(b) by 0 days.

(21) Appl. No.: 17/068,724

(22) Filed: Oct. 12, 2020

(65) Prior Publication Data

US 2021/0025241 A1 Jan. 28, 2021

Related U.S. Application Data

(63) Continuation-in-part of application No. 16/285,199, filed on Feb. 26, 2019, now Pat. No. 10,807,132.

(60) Provisional application No. 63/033,915, filed on Jun. 3, 2020.

(51) Int. Cl.
| | |
|---|---|
| *E21B 7/18* | (2006.01) |
| *G21F 9/24* | (2006.01) |
| *G21F 9/34* | (2006.01) |
| *E21D 13/00* | (2006.01) |
| *G21F 9/30* | (2006.01) |

(52) U.S. Cl.
CPC ............ *E21B 7/18* (2013.01); *E21D 13/00* (2013.01); *G21F 9/24* (2013.01); *G21F 9/34* (2013.01); *G21F 9/304* (2013.01)

(58) Field of Classification Search
CPC ... E21B 7/18; E21B 7/28; E21B 10/32; B09B 1/008; G21F 9/24; G21F 9/34
See application file for complete search history.

(56) References Cited

U.S. PATENT DOCUMENTS

| | | | |
|---|---|---|---|
| 3,236,053 A * | 2/1966 | Billue | G21F 9/24 |
| | | | 588/17 |
| 3,565,191 A | 2/1971 | Bowen | |
| 4,104,503 A | 8/1978 | Di Piazza | |
| 4,354,560 A * | 10/1982 | Johnson | E21B 7/28 |
| | | | 175/215 |
| 4,618,009 A | 10/1986 | Carter | |
| 4,976,569 A * | 12/1990 | Braehler | B09B 1/00 |
| | | | 405/129.35 |
| 6,065,551 A * | 5/2000 | Gourley | E21B 7/28 |
| | | | 175/19 |
| 6,189,629 B1 | 2/2001 | McLeod | |
| 6,263,984 B1 | 7/2001 | Buckman | |

(Continued)

*Primary Examiner* — Janine M Kreck
(74) *Attorney, Agent, or Firm* — Eric Kelly

(57) ABSTRACT

Systems and/or methods of waste disposal use human-made caverns that are constructed within deep geological formations. A given human-made cavern may be constructed by first drilling out a vertical wellbore to a deep geological formation. Then a bottom portion of the vertical wellbore is jet drilled using an abrasive jetting fluid to form a launch chamber of void volume, that is sized to fit a reaming tool in its deployed open configuration. A reaming tool, in a closed configuration, is then inserted into the vertical wellbore for landing in the launch chamber. The reaming tool is then deployed into its open configuration while in the launch chamber. Reaming operations then occur from the launch chamber directed downwards within the deep geological formation, forming a given human-made cavern. The newly formed human-made cavern may be conditioned and/or configured for receiving amounts of the waste for long-term disposal and/or storage.

23 Claims, 16 Drawing Sheets

(56) References Cited

U.S. PATENT DOCUMENTS

| | | |
|---|---|---|
| 6,283,230 B1 | 9/2001 | Peters |
| 6,378,629 B1 | 4/2002 | Baird |
| 6,578,636 B2 | 6/2003 | Mazorom |
| 6,668,948 B2 | 12/2003 | Buckman |
| 6,722,452 B1 | 4/2004 | Rial |
| 7,168,491 B2 | 1/2007 | Malone |
| 7,320,372 B2 | 1/2008 | Falgout |
| 7,350,577 B2 | 4/2008 | Howard |
| 7,419,014 B2 | 9/2008 | Blange |
| 7,971,658 B2 | 7/2011 | Buckman |
| 8,196,680 B2 | 6/2012 | Buckman |
| 8,267,198 B2 | 9/2012 | Buckman |
| 8,267,199 B2 | 9/2012 | Buckman |
| 8,490,448 B2 | 7/2013 | Fogg |
| 8,807,245 B2 | 8/2014 | Scott |
| 9,567,820 B2 | 2/2017 | Buckman |
| 9,677,298 B2 | 6/2017 | Konduc |

\* cited by examiner

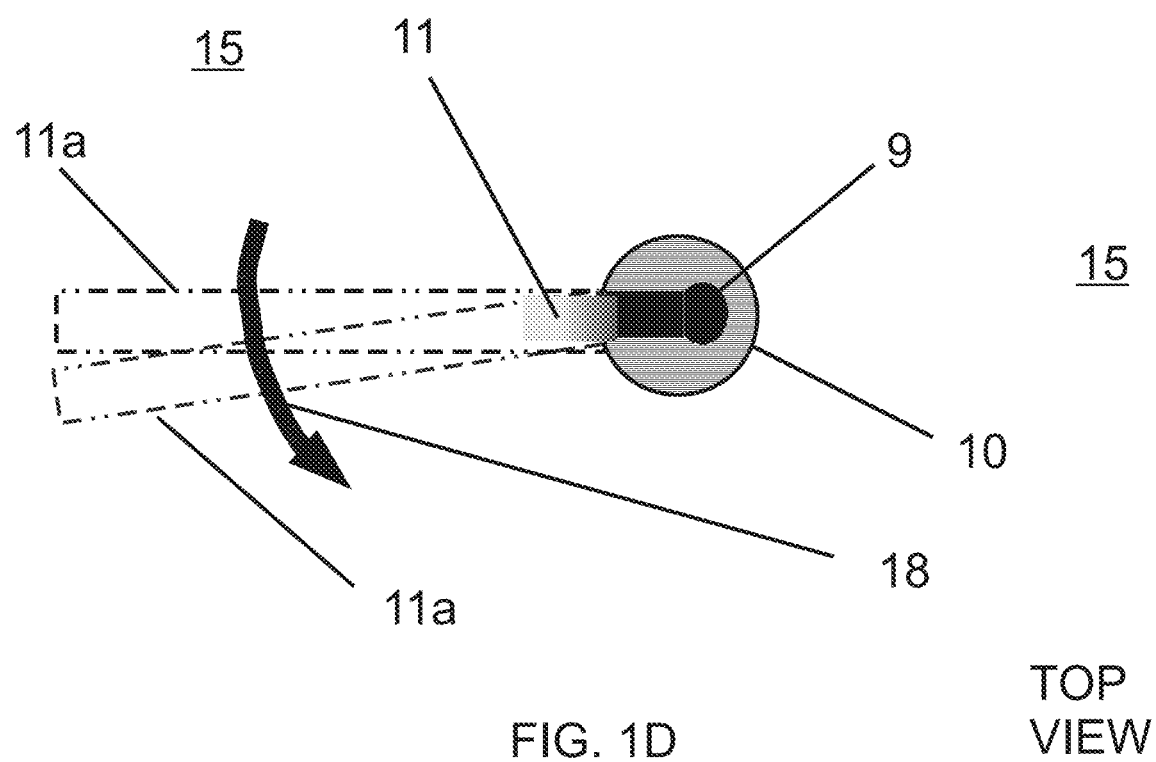
FIG. 1D  TOP VIEW

DEEP HUMAN-MADE CAVERN CONSTRUCTION

PRIORITY NOTICE

The present application claims priority under 35 U.S.C. § 119(e) to U.S. Provisional Patent Application Ser. No. 63/033,915 filed on Jun. 3, 2020, the disclosure of which is incorporated herein by reference in its entirety.

The present patent application is a continuation-in-part (CIP) of U.S. non-provisional patent application Ser. No. 16/285,199 filed on Feb. 26, 2019, and claims priority to said U.S. non-provisional patent application under 35 U.S.C. § 120. This U.S. non-provisional identified patent application is incorporated herein by reference in its entirety as if fully set forth below.

TECHNICAL FIELD OF THE INVENTION

The present invention relates in general to deeply located human-made caverns and more specifically to construction, implementation, and usage of the deeply located human-made caverns for disposal/storage of hazardous waste materials, wherein deeply located may be within a subterranean geological formation at a predetermined depth below the Earth's surface.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Implementation of relatively large diameter (e.g., six feet or more) deep human-made caverns in underground formations (e.g., 2,000 feet or so and deeper) has been a goal of several and very different industries. These industries vary from the nuclear warfare groups that desire such deeply located human-made caverns for underground atomic weapons testing to other the industries that desire to store large volumes of fluids and/or gases of various kinds. In the past, it has been challenging, dangerous, and expensive to try to store radioactive and/or nuclear materials (such as waste materials) in underground caverns except for those cases where solid quantities of material are stored in barrels, individual capsular containers, slurry material, open pits and also within shallow mines which are very close to a terrestrial surface (of the Earth). That is, in the past, deeply located human-made caverns have not been so utilized.

Also, in industrial settings, the storage of large quantities of material has always been in near-surface caves built out of native rock or in somewhat deep natural salt deposits in which the caverns have been leached out by circulating water action.

Both methods (i.e., near-surface caves built out of native rock or in somewhat deep natural salt deposits) have significant costs and time constraints. A better method is needed to facilitate the development and/or construction of deep human-made caverns which have significant capacity to store, dispose, and/or contain various types of materials, waste or otherwise. The inventions herein provide at least some teachings, systems, methods, and/or mechanisms utilizing available engineering and wellbore systems are used in the construction of deeply located human-made caverns.

Underground human-made caverns have been used to store natural gas, hydrocarbon liquids, waste-water, petroleum products, and other commercial products for many decades. These caverns have generally been drilled into and/or leached from subsurface salt domes or salt formations which have been formed over geologic time by salt intrusions or depositions from regional seas or other long-gone aqueous environments.

Human-made caverns within salt deposits are typically created by injecting fresh water into subterranean salt formations and withdrawing the resulting brine. This process is referred to as solution mining. Over time, numerous human-made caverns in salt deposits have been solution mined by the petroleum industry for use in storing hydrocarbons like the Strategic Petroleum Reserves which holds hundreds of millions of barrels of crude oil; and for disposing of non-hazardous oilfield wastes (NOW).

However, to date (circa 2020), human-made caverns in salt deposits have not been routinely implemented to store large quantities of dangerous waste material.

Atomic testing agencies have provided prior art related to implementation of large diameter underground caverns. About $57,000,000 (1967 USD) was spent over two years on a drilling effort in Alaska. The Parker Drilling company of Tulsa, Okla., in 1968 contracted with and drilled two secret wellbores in Alaska for the NRC (Nuclear Regulatory Commission). The first wellbore was a 90-inch diameter to a depth of 6,120 feet and the second was a 120-inch diameter wellbore to a depth of 4,427 feet. The operation costs were prohibitive. The drill rig was specialized and was later relegated to a museum in western Oklahoma. These two prior art wellbores were "special-built and dedicated" requests by the NRC. These wellbore types would not be able to be modified for general utilization in the nuclear waste disposal process because of the special requirements stipulated by the NRC regarding physical dimensions, capacity, and wellbore safety were geared for nuclear weapons testing. A very different technology from nuclear waste disposal.

Today (2020), several operating well service companies like Halliburton, Schlumberger, and others have developed unique drilling and reaming systems that allow an existing wellbore to be "reamed" out to a larger diameter to provide more flexibility in drilling or well servicing operations. This type of reaming operation is significantly quicker and less expensive than drilling the final sized enlarged wellbore directly from the surface. These additional reaming operations typically are only able to enlarge the original wellbore by at most 75% of its original size. For example, a 12-inch initial wellbore may be enlarged to about 20 inches; and/or a 20-inch diameter initial wellbore may be enlarged to about 35 inches. These enlarged diameters of 20 to 35 inches are not sufficient to provide the large volumes needed to store or dispose of the millions of gallons/tons of material that is customarily available for disposal/storage. A means is needed to enlarge initial wellbore up to and including 120 inches diameter depending on depth, to provide the significant storage volumes in some rock formations.

These prior art approaches to making large diameter wellbore suitable for deep disposal or storage are limited (e.g., they do not provide a sufficiently enlarged diameter). Better systems are needed. The better systems combine various aspects of available rotary drilling and jet drilling technologies to provide a system that can economically and in a reasonably short time provide a large diameter human-made cavern of sufficient size/depth to make disposal/storage therein an economic reality.

This invention expands on the boundaries of the prior art, and broadens the scope of the existing prior art technologies, with the embodiments illustrated herein, able to combine jet drilling processes with the rotary drilling systems to formulate system and methods for building/constructing large diameter human-made caverns (e.g., of 120 inches in diameter or so) in a rapid manner and in an economical fashion for waste disposal and/or storage. The jet drilling processes may be modified oilwell drilling operations, in which coiled tubing or high-pressure jointed pipe conveys high-pressure fluid to a downhole jet drill tool assembly to typically penetrate or carve out a given rock formation. The downhole jet drill assembly may turn in a short radius of about three (3) inches. The operating jet drill pressures can range up to 20,000 psi (pounds per square inch) or more and flow rates are generally less than 10 gallons per minute. Jet drilling processes may carve out a section of essentially void space from a formation occur in a matter of minutes. The jet drill assembly itself may be manipulated by a series of programmed indexing or translational control measures. The operational jet drilling system can be deployed in either of two methods from the surface. The high-pressure jointed pipe allows the drilling operator to complete the entire jet drilling process utilizing a workover rig. In contrast, coiled tubing method allows for a shorter trip time for deeper disposal operations. These deep zones would be formations from 5,000 feet to 10,000 feet or more deep.

Jet drilling technology has been developed over the last four decades. Some aspects may even be routine in some oilfield operations. The required equipment such as, high pressure pump, control systems, high pressure tubes, and nozzle configurations are well known and may be modified as required to operate under different downhole conditions as required in this invention. Operationally, the high pressure jet nozzle accelerates the fluid, with abrasive particles therein, to speeds close to 1,000 feet/second producing four main rock (formation) penetration mechanisms. These mechanisms are: 1) surface erosion; 2) hydraulic fracturing; 3) poro-elastic tensile failure; and 4) cavitation. Jet drill functionality and configuration of the jet nozzles may allow the jet nozzle to move away from the wellbore a predetermined distance into the formation thus enlarging the jetted (excavated) zone or cavity. In some embodiments of this invention, jet movement into the formation may be a minimal distance. Rock penetration rates between 0.5 foot/minute to 10 feet/minute have been achieved in the field. In the formations contemplated in this invention operating penetration rates between 0.5 foot/minute to 2 feet/minute may be expected. In some extreme published cases, some 10,000 psi fluid pressure jet drilling tools have pushed (moved) their nozzles into the formation forming a lateral (radially extending) wellbore up to 700 feet long and with diameters up to 4 inches in some cases.

The sequential use of high-pressure jet drill processing with large diameter rotating reamer systems may together be used to implement a waste disposal system shown in the embodiments herein, which can meet the disposal and/or storage needs of many diverse industries.

There are long felt, but unmet, needs for devices, apparatus, tools, machines, means, systems, mechanisms, and/or methods that would allow the development of large diameter human-made caverns for storage and/or disposal of waste; and wherein such large diameter human-made caverns may be located deeply and far below the Earth's surface; and wherein the waste may be high-level nuclear waste which may exist in a variety of difficult to manage physical forms (such as, but limited to, liquids, sludges, powders, solids, etc.).

A need, therefore, exists for new systems and/or methods, that are also economic and implementable in relatively short time periods, for safely disposing of waste, such as, but not limited to radioactive waste, in a controlled manner along with depositing such waste in a system that is designed to meet the requirements of public acceptance along with regulatory guidelines/requirements.

It is to these ends that the present invention has been developed.

BRIEF SUMMARY OF THE INVENTION

To minimize the limitations in the prior art, and to minimize other limitations that will be apparent upon reading and understanding the present specification, the present invention may describe systems and/or methods of waste disposal that use human-made caverns that are constructed within deep geological formations. Some embodiments of the present invention may describe means, systems, mechanisms, and/or methods for implementing large diameter human-made caverns configured for (capable of) the storage and/or disposal of radioactive materials within the human-made subterranean cavities within deep geological formations. In some embodiments, such stored and/or disposed of radioactive materials may be retrieved for auditing, inspection, technical, and/or operational reasons.

For example, and without limiting the scope of the present invention, a given human-made cavern may be constructed by first drilling out a (substantially) vertical wellbore to or into a deep geological formation; then a bottom portion of that vertical wellbore may jet drilled, using an abrasive jetting fluid and at least one jetting tool, to form a launch chamber of void volume, that is sized to fit a reaming tool in its deployed open configuration; the jet drilling equipment may then be removed; the reaming tool, in a closed configuration, may then be inserted into the vertical wellbore for landing in the launch chamber; the reaming tool is then deployed into its open configuration while in the launch chamber; reaming operations, using the deployed and open reaming tool, then occur from the launch chamber directed downwards within the deep geological formation, forming a given human-made cavern. The newly formed human-made cavern may then be conditioned and/or configured for receiving amounts of the waste for long-term disposal and/or storage. Quantities of the waste may then be loaded into that human-made cavern. The human-made cavern, with its waste, may then be closed and/or sealed off.

It may be an object of some embodiments to provide methods of the types described herein wherein a given human-made cavern of substantial volumetric capacity may be formed in a deep geologic formation being several thousand feet below the Earth's surface and wherein the human-made cavern may be several thousand feet in vertical extent with a reasonably large diameter of several feet (e.g., three (3) to ten (10) feet). A human-made cavern of this size can provide close to 1,000,000 gallons of liquid waste storage. By enlarging a pilot wellbore, once a sufficient depth may be reached, to a significant diameter and continuing to vertically drill-out the given human cavern for up to several thousand feet, may produce such a permanent human-made phenomenon for waste storage and/or for disposal.

Briefly, the human-made cavern building systems and methods in accordance with some embodiments of this invention may achieve the intended objectives by including the steps of: drilling a pilot well (that may be substantially vertical) which intersects a deep geologic formation; and creation of a small "launch chamber" by jet drilling out a circular/cylindrical chamber of limited size and extent below the pilot wellbore (at a bottom of the pilot wellbore); removing the jet drilling equipment used for jet drill out the launch chamber; inserting an expandable downhole reamer tool in a "closed mode" (closed configuration) which is capable of being expanded to its fullest extent, the "open mode" (open configuration) in the launch chamber, and finally drilling the disposal or storage human-made cavern with the expanded reamer (in the open configuration) to a predetermined/designed depth. The reamer tool is then closed and in the "closed" mode is returned to the surface through the initial pilot wellbore.

Recently (2018), an oil well service company has published that it successfully drilled a 54-inch wellbore during an offshore well drilling from a drilling platform. Modifying such oilfield drilling technology and combining diverse drilling technologies allows the implementation of embodiments of the present invention.

The ability to economically provide a human-made cavern of sufficient size and volume, for safe disposal of substantial quantities of waste is completely feasible today with the systems and/or methods described herein. What is required is more than just the ability to store some small amount of waste in a single "narrow" vertical wellbore, however, there are needs for storage of massive quantities of waste and the storage in limited vertical wells may not be economically practical. Currently the United States Department of Energy has made attempts to store (dispose) of quantities of HLW in the lowermost sections of a single vertical wellbore. This prior art approach has at least two significant drawbacks: (a) the volumes stored in a small diameter, e.g., less than a nine (9) inch wellbore, is miniscule compared to the current disposal volumes on the Earth's surface waiting and needing to be disposed of properly in a safe long-term solution; and/or (b) vertically stacking capsules of waste material whose density may be as high as 19 gm/cc (grams per cubic centimeter) creates excessive compressive forces acting on the walls of the wellbore casing potentially leading to burst/rupture/failure conditions.

Some of the technical drivers that have allowed the embodiments of present invention herein to be implemented may be as follows: jet drilling improvements, drilling rig improvements, and/or some specific technological improvements.

The jet drilling systems may be controllable and with abrasive fluids have achieved significant progress in drilling "drainholes" at great depths in many consolidated and unconsolidated and metamorphic rocks for oil and gas production.

Drilling rig features have improved including, but not limited to: increased hydraulic pressure availability at the drill bit; available drilling rig horsepower up to as much as 4,000 hydraulic horsepower; available pump horsepower; available rig capacity up to 2,000,000 pounds of dead weight lift is available and rigs with high levels of "push down" capacity for drilling; high downhole drilling fluid pressures can be maintained; drilling rig ability to pump slurries of high density, pounds per gallon (ppg) have increased considerably; and remote and automatic control software for rig operations.

Specific technological improvements that pertain to the under-reaming operations and under-reaming equipment have allowed successful under-reaming needed to make and manage large diameter human-made caverns. Some of these improvements may include: hydraulically actuated reamer elements expandable and retractable with pump pressure and downhole RFID (radio frequency ID) triggering with injected RFID tags; cutter arms move upward and out simultaneously from the reaming tool body; fail-safe cutter arm retraction; reverse actuating mechanism maintains that the reaming tool is open, while drill string weight prohibits tool closure; unrestricted fluid flow through internal diameters of the wellbore tubular goods; roller cone cutters are specifically designed for the under-reamers and are consistent with downhole diameters; reamer bodies machined from heat-treated steel bar, giving it exceptional strength; jet nozzles near the cutters allow for cutter washing and cooling; and a variety of cutting structures is available to facilitate the reaming process.

It is an objective of the present invention to provide systems and/or methods for constructing human-made caverns in deep geological formations.

It is another objective of the present invention to provide systems and/or methods for constructing human-made caverns in deep geological formations, wherein the human-made caverns have relatively large diameters (e.g., from three (3) feet to ten (10) feet).

It is another objective of the present invention to provide systems and/or methods for constructing human-made caverns in deep geological formations, wherein the human-made caverns have relatively long (substantially) vertical lengths (e.g., from 1,000 feet to 10,000 feet).

It is another objective of the present invention to provide systems and/or methods for constructing human-made caverns in deep geological formations, wherein the human-made caverns are configured for and capable of long-term storage/disposal of radioactive materials.

It is another objective of the present invention to provide systems and/or methods for sequestering high-level nuclear waste (HLW) (and/or the like) in large enough volumes and at a considerable enough distance below the surface of the Earth to maintain the highest level of safety as possible.

It is another objective of the present invention to provide systems and/or methods for constructing human-made caverns in deep geological formations, wherein the human-made caverns are configured for and capable of long-term storage/disposal of waste materials.

It is another objective of the present invention to provide systems and/or methods for constructing human-made caverns in deep geological formations, wherein construction of the human-made caverns is facilitated by down-hole reaming tool(s).

It is another objective of the present invention to provide systems and/or methods for constructing human-made caverns in deep geological formations, wherein use of downhole reaming tool(s) is facilitated by constructing a launch chamber with a volume of sufficient size to permit expansion of the reaming tool(s) into an open configuration.

It is another objective of the present invention to provide systems and/or methods for constructing human-made caverns in deep geological formations, wherein when the reaming tool(s) are not being operated for reaming operations, lowering and raising of the reaming tool(s) through wellbores (of relatively smaller diameter(s)) is done while the reaming tool(s) are in a substantially closed configuration.

It is another objective of the present invention to provide systems and/or methods for constructing human-made caverns in deep geological formations, wherein construction of launch chambers is facilitated by use of jet drilling equipment.

It is another objective of the present invention to provide systems and/or methods for constructing human-made caverns in deep geological formations, use of jet drilling equipment is done by horizontal/rotational indexing and vertical indexing.

It is another objective of the present invention to provide systems and/or methods for constructing human-made caverns in deep geological formations, wherein the jet drilling is done at high-pressures and/or with abrasive additives added to (included in) the jetting fluid.

It is another objective of the present invention to provide systems and/or methods for constructing human-made caverns in deep geological formations, wherein a given human-made cavern is connected to and located below a given launch chamber.

It is another objective of the present invention to provide systems and/or methods for constructing human-made caverns in deep geological formations, wherein the deep geological formations have predetermined properties for making the systems and/or methods safer, more efficient, and/or cost effective than prior art/conventional disposal systems/methods.

It is yet another objective of the present invention to provide systems and/or methods for constructing human-made caverns in deep geological formations, wherein the human-made caverns are configured for and capable of long-term storage/disposal of radioactive materials, wherein the systems and/or the methods are safer, more efficient, and/or cost effective than prior art/conventional disposal systems/methods.

Recapping at least some of the above-noted objectives, some embodiments may provide means, systems, mechanisms, and methods for the implementation of human-made caverns using a sequential combination of drilling technologies (e.g., mechanical/rotatory drilling, jetting drilling, and/or reaming).

These and other advantages and features of the present invention are described herein with specificity so as to make the present invention understandable to one of ordinary skill in the art, both with respect to how to practice the present invention and how to make the present invention.

The preceding and other steps, objects, and advantages of the present invention will become readily apparent upon further review of the following detailed description of the preferred method as illustrated in the accompanying drawings.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry may not be depicted in order to provide a clear view of the various embodiments of the invention. In some figures certain elements may be shown but may not be in place and/or used simultaneously during a specific operation or process of embodiments of the invention.

FIG. 1D may show a top-down schematic view or a traverse-cross-sectional schematic view of/through a jetting tool and its horizontal (rotational) indexed movements, wherein such movements in part may facilitate forming the given launch chamber.

Figure 1A:
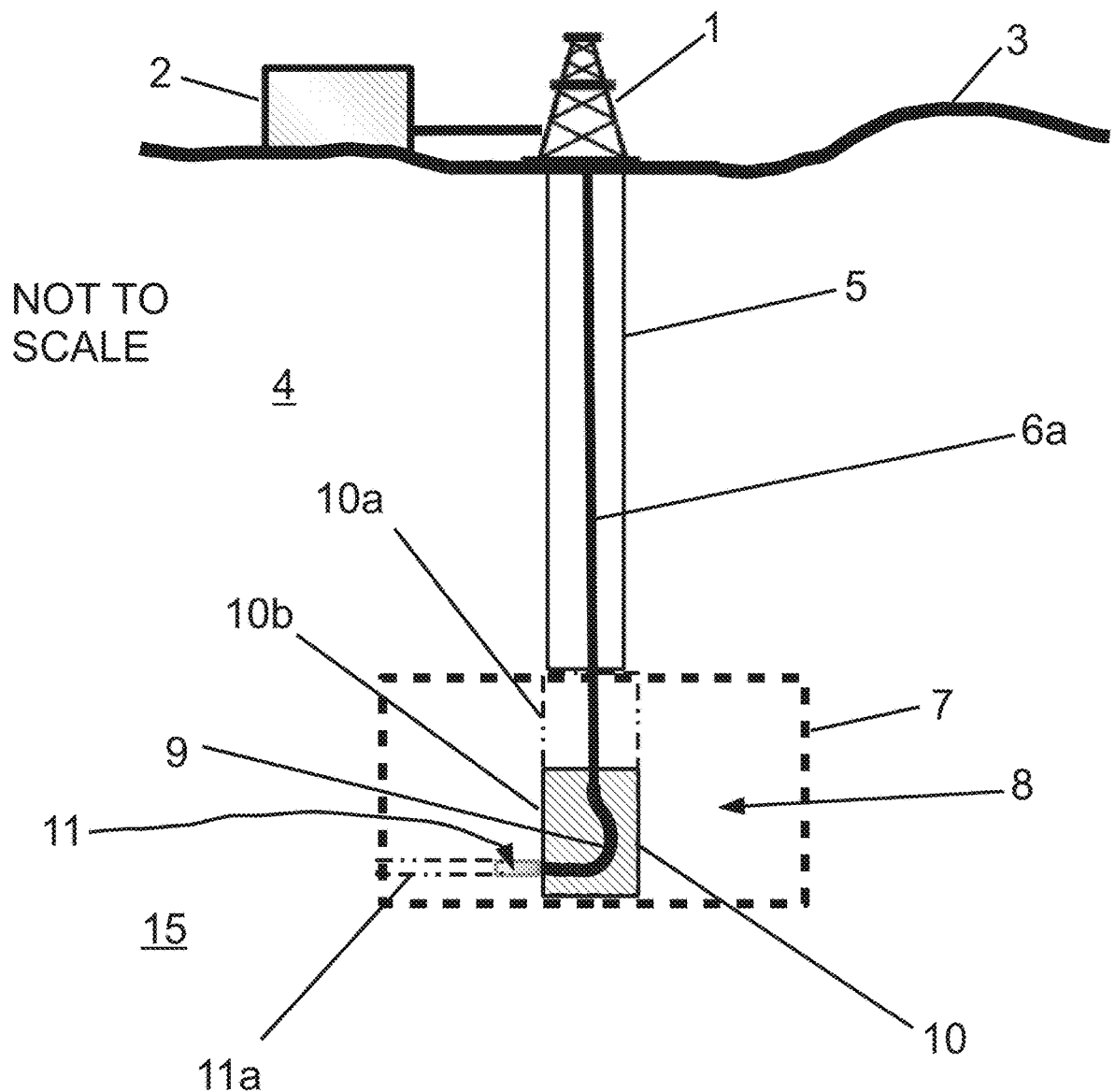
FIG. 1A may show a schematic side view of various components that may be used in some embodiments of the invention with respect to forming a "launch chamber."

REFERENCE NUMERAL SCHEDULE 1 drilling rig 1
2 surface facilities 2
2a jet fluid supply (reservoir) 2a
2b pump means 2b
3 terrestrial ground-level 3
4 near surface formations 4
5 vertical pilot wellbore 5
6a high-pressure conduit 6a
6b drill pipe apparatus 6b 6c jet drill conduit centralizer 6c
7 launch chamber 7
8 volume inside launch chamber 8
9 jet drill fluid pipe 9
10 jetting tool 10
10a jetting tool device in upper position 10a
10b jetting tool device in lower position 10b
11 abrasive jet flow 11
11a channel jetted (carved) in formation rock 11a
12 reaming tool 12
12a large diameter moveable cutting arm 12a
12b small diameter moveable cutting arm 12b
12c drill string 12c
13 expandable and retractable cutting arm 13
14 human-made cavern 14
15 disposal formation rock 15
16 direction of motion of moveable reamer arm 16
17 waste material 17
18 horizontal and rotational indexing direction of jet drilling 18
19 vertical indexing direction of jet drilling 19
20 strata demarcation 20
600 method of forming the initial vertical wellbore 600
601 step of locating wellsite and setting up rig 601
603 step of preparing surface facilities 603
605 step of drilling vertical wellbore 605
607 step of removing rotary equipment and deploying jet drill system 607
609 step of landing the jet drill device in vertical wellbore 609
700 method of jet drilling the launch chamber below the vertical wellbore 700
701 step of deploying the jet drill system at bottom of vertical wellbore 701
703 step of initiating jet drill system 703
705 step of positioning jet drill device 705
707 step to control channel size in host rock 707
709 step of horizontally indexing jet drill 709
711 step of completing horizontal rotational jet drilling 711
713 step of vertically indexing jet drill 713
715 step of jet drilling at higher level 715
717 step of checking launch chamber dimensions 717
719 completing launch cavity 719
721 step of retrieving jet drill equipment 721
800 method of forming the man-made cavern with expanded reamer 800
801 step of deploying reamer tool in closed mode 801
803 step of expanding the reamer tool arms 803
805 step of using surface drill rig system to operate the reamer tool 805
807 step of collapsing and retrieving reamer tool 807
809 step of preparing disposal cavity 809
811 step of introducing waste into cavern 811
813 step of stopping operations 813

DETAILED DESCRIPTION OF THE INVENTION

As noted above, embodiments of the present invention may describe means, systems, mechanisms, and/or methods for the implementation and construction of large diameter human-made subterranean caverns within deep geological formations, wherein such human-made caverns are configured for long-term storage and/or disposal of predetermined materials. The predetermined materials may or may not be waste.

In this patent application, the terms "radioactive material," "radioactive waste," "nuclear material," "nuclear waste," and/or "high-level nuclear waste" (HLW) may be used interchangeably herein.

In this patent application, the terms "cavern," "cavity," and/or "chamber," may be used interchangeably with the same meaning. Further, "cavern," "cavity," and/or "chamber," may mean an at least substantially hollow void space that may be human-made. However, "launch chamber" and "human-made cavern" may refer to different types of human-made structures that may be constructed in different ways.

In this patent application, "disposal formation rock," "matrix rock," "host rock," and/or "deep geologic formation" may be used interchangeably; and may refer to a rock structure within a deep geological formation that may be hosting (housing) one or more human-made caverns.

In this patent application, the terms "well" and "wellbore" may be used interchangeably and may refer to (substantially) cylindrical drilled out elements implemented in design and/or installation processes of some embodiments of the present invention.

In this patent application, the terms "single well" or "common well" may refer to a wellbore that may be shared.

In this patent application, the term "pilot" may refer to a first or initial wellbore that may be drilled out from a given site on a terrestrial surface of the Earth, using a given drilling rig. Often such a pilot wellbore may be substantially vertical. In some embodiments, a pilot wellbore may be a single wellbore, a common wellbore, and/or a shared wellbore.

In this patent application, the term "ream" and "under-ream" may be used interchangeably to mean the enlarging of a wellbore, hole, and/or void space in a rock medium, such as a portion of a given deep geological formation.

In this patent application, "vertical" and "horizontal" may be with respect to Earth's terrestrial surface at a given drill site. That is, "horizontal" may be substantially parallel with respect to Earth's terrestrial surface at the given drill site; and "vertical" may be substantially orthogonal/perpendicular with respect to Earth's terrestrial surface at the given drill site. Or in the alternative, "vertical" and "horizontal" may be with respect to Earth's local gravitational field vector at a given drill site. That is, "vertical" may be substantially parallel with respect to Earth's local gravitational field vector at the given drill site; and "horizontal" may be substantially orthogonal/perpendicular with respect to Earth's local gravitational field vector at the given drill site.

In this patent application, "vertical wellbores" need not be geometrically perfectly vertical; but rather may be substantially vertical (e.g., more vertical than horizontal).

In this patent application, "lateral wellbore" and "horizontal wellbore" may be used interchangeably. Further, "lateral wellbores" or "horizontal wellbores need not be geometrically perfectly horizontal; but rather may be substantially horizontal (e.g., more horizontal than vertical).

Note, unless an explicit reference of "vertical wellbore" or "lateral wellbore" (i.e., "horizontal wellbore") accompanies "wellbore," use of "wellbore" herein without such explicit reference may refer to vertical wellbores or lateral wellbores, or both vertical and lateral wellbores.

In this patent application, the term "launch chamber" and "launch system" may be used to describe a (human-made) chamber which is developed below the initial pilot wellbore (or at the bottom of the initial pilot wellbore) by jet drilling equipment and actions. This "launch chamber" may be a location into which a closed reamer tool may be inserted from the Earth's terrestrial surface and then opened/expanded completely for subsequent reaming operations used for construct a given human-made cavern. The launch chamber is constructed using jet drilling using fluid mechanics; whereas, the given human-made cavern is constructed from reaming operations using a reaming tool of mechanical/rotary mechanics.

In this patent application, the term "indexing" may be used to describe a mechanical process in which a device such as a jet drill (or the like) may be moved incrementally a (small) angular distance (rotation) and/or a (small) linear distance in a given plane to a new position to continue jet drilling operations at the new position. Indexing can be in any of three different axes and/or directions. In some embodiments, of the present invention such indexing of a given jet drill (or the like) may done horizontally, rotationally, and/or vertically.

In this patent application, the term "jet drill" may be used to describe a mechanical device in which a highly pressurized abrasive fluid is hydraulically discharged/ejected through a nozzle, orifice, and/or a jet, with sufficient force/pressure and/or with fluid properties (e.g., abrasive properties) to cut through solid material, including portions of a given deep geological formation. These "jet drills" may have one or multiple nozzles strategically placed in a radial system or linear system to accelerate the cutting forces/pressures of the abrasive fluid jets. The terms "jet drilling," "jetting," and/or "hydraulic jetting" may be used interchangeably to describe the mechanical process of cutting reservoir rock by hydraulically pressured abrasive filled liquids.

The novel features which are considered characteristic for various embodiments of the invention are set forth in the appended claims. Embodiments of the invention itself, however, both as to its construction and its methods of operation, together with additional objects and advantages thereof, will be best understood from the following description of the specific embodiments when read and understood in connection with the accompanying drawings. Attention is called to the fact, however, that the drawings are illustrative only, and that changes may be made in the specific construction illustrated and described within the scope of the appended claims.

These and other advantages and features of the present invention are described herein with specificity so as to make the present invention understandable to one of ordinary skill in the art, both with respect to how to practice the present invention and how to make the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Note, FIG. 1A through FIG. 1H may be directed to various aspects of launch chambers 7. In some embodiments, a given launch chamber 7 may be formed at a distal/terminal portion of a given substantially vertical wellbore 5. In some embodiments, a purpose of a given launch chamber 7 may be to provide sufficient space, area, room, and/or volume (see e.g., volume 8) for deployment, expansion, extension, retraction, and/or operation of a given reaming tool 12, wherein the given reaming tool 12 may then be used for forming at least one human-made cavern 14 from the given launch chamber 7. That is, in some embodiments, a given launch chamber 7 may be used to facilitate forming a given human-made cavern 14 by permitting use of a given reaming tool 12. In some embodiments, jet drilling may be used to form a given launch chamber 7; whereas, reaming via reaming tool 12 may be used to form a given human-made cavern 14. In some embodiments, reamer tool 12 may be opened and/or closed from inside a given launch chamber 7, from which reamer tool 12 may be retrieved to terrestrial ground-level 3 via the smaller diameter vertical wellbore 5. In some embodiments, a given human-made cavern 14 may be used to receive waste material(s) 17 therein for disposal and/or storage purposes. Note, reaming tool 12, human-made cavern 14, and waste material(s) 17 are not shown in FIG. 1A through FIG. 1H.

In some embodiments, waste material(s) 17 may be hazardous, dangerous, radioactive, portions thereof, combinations thereof, and/or the like material(s). In some embodiments, waste material(s) 17 may be one or more of: nuclear waste, radioactive waste, high-level nuclear waste (HLW), spent nuclear fuel (SNF), weapons grade plutonium (WGP), uranium-based waste products, depleted uranium products, depleted uranium penetrators (DUP), uranium hexafluoride (UF6), portions thereof, combinations thereof, and/or the like. In some embodiments, waste material(s) 17 may be in a predetermined form/format. In some embodiments, waste material(s) 17 may be in one or more forms/formats of: solid, liquid, liquefied, slurry, pellet, powder, brick, spherical, ball, gel, rod, cylindrical, briquette, foam, portions thereof, combinations thereof, and/or the like. In some embodiments, waste material(s) 17 may be received into a given human-made cavern 14 for disposal and/or long-term storage. In some embodiments, a given human-made cavern 14 may be located entirely within a given disposal formation rock 15. See e.g., FIG. 3 for waste material(s) 17.

FIG. 1A may show a schematic side view of various components that may be used in some embodiments of the invention with respect to forming a given launch chamber 7. In some embodiments, a given launch chamber 7 may be formed in disposal formation rock 15. In some embodiments, disposal formation rock 15 may be located at least some predetermined distance (depth) from a terrestrial ground-level (surface) 3. In some embodiments, "Earth's surface" and "terrestrial ground-level" may be used interchangeably herein and associated with reference numeral 3 in the relevant figures. In some embodiments, disposal formation rock 15 may also be referred to as "deep geologic formation" or as "host rock" or as "matrix rock." In some embodiments, disposal formation rock 15 may be located substantially from about 2,000 feet to about 30,000 feet below terrestrial ground-level 3, plus or minus 1,000 feet. In some embodiments, disposal formation rock 15 (i.e., the deep geological formation) may be located substantially from 2,000 feet to 30,000 feet, plus or minus 1,000 feet, substantially vertically below the drill site. In some embodiments, disposal formation rock 15 may be one or more of: an igneous rock formation, a metamorphic rock formation, a sedimentary type rock formation, portions thereof, combinations thereof, and/or the like. In some embodiments, disposal formation rock 15 may have desirable and/or required properties to contain the waste material(s) 17 over long time intervals (e.g., of at least one thousand years) and may be able to minimize migration of waste material(s) 17 and/or its radionuclides away from the human-made caverns 14 that are housing the waste material(s) 17. In some embodiments, at least some of desired and/or required properties of disposal formation rock 15 may be demonstrated by petrophysical analysis prior to instituting a given human-made cavern 14 therein. In some embodiments, disposal formation rock 15 may have geologic properties that make the storing/disposal of waste material(s) 17 within disposal formation rock 15 relatively safe. For example, and without limiting the scope of the present invention, in some embodiments, disposal formation rock 15 may have one or more of the following geologic properties: structural closure, stratigraphically varied, low porosity, low permeability, low water saturation, and reasonable clay content. In some embodiments, it may be desirable to locate, create, form, and/or build one or more human-made cavern(s) 14 within disposal formation rock 15.

Continuing discussing FIG. 1A, in some embodiments, disposal formation rock 15 may be reach by drilling at least one substantially vertical (pilot) wellbore 5 from terrestrial ground-level 3 to disposal formation rock 15, using at least one drilling rig 1. In some embodiments, surface drilling rig 1 may be an apparatus that drills the vertical pilot wellbore 5. In some embodiments, drilling rig 1 may be located on terrestrial ground-level 3. In some embodiments, drilling rig 1 may be used for one or more of: drilling substantially vertical (pilot) wellbore 5, for landing and/or operating jet drilling equipment; for landing and/or operating reamer tool 12; for forming a human-made cavern 14 using reamer tool 12; for inserting waste material(s) 17 into a given human-made cavern 14; portions thereof; combinations thereof; and/or the like. In some embodiments, drilling rig 1 may have supplementary features to allow safe handling of the waste material 17, such as, but not limited to, radiation shielding. In some embodiments, drilling rig 1 may be substantially as a drilling rig used in oil-field drilling, pumping, and/or maintenance operations.

Continuing discussing FIG. 1A, in some embodiments, a given vertical wellbore 5 may be at least substantially vertical. In some embodiments, vertical wellbore 5 may be perfectly vertical to mostly vertical. In this context vertical may be substantially orthogonal with respect to terrestrial ground-level 3; and/or vertical may be substantially parallel with a vector of Earth's gravitational field at a given drill site on terrestrial ground-level 3. In some embodiments, vertical wellbore 5 may be a pilot wellbore in the sense that vertical wellbore 5 may be a first/initial wellbore drilled at a given drill site on terrestrial ground-level 3. In some embodiments, subsequent drilling operations may widen a diameter of at least a portion of vertical wellbore 5 and/or may lengthen a depth/distance of vertical wellbore 5. In some embodiments, vertical wellbore 5 may run from terrestrial ground-level 3 to disposal formation rock 15. In some embodiments, vertical wellbore 5 may run into at least a portion of disposal formation rock 15. In some embodiments, once vertical wellbore 5 may be formed, at least some interior surfaces of vertical wellbore 5 may be lined with casing/piping, with cement, portions thereof, combinations thereof, and/or the like.

In some embodiments, a given section of vertical wellbore 5 may have a predetermined length. In some embodiments, a given section of vertical wellbore 5 may have a minimum predetermined length (e.g., to run from terrestrial surface 3 to disposal formation rock 15). In some embodiments, a given section of vertical wellbore 5 may have a length selected from a range of 2,000 feet to 25,000 feet, plus or minus 1000 feet. In some embodiments, a given section of vertical wellbore 5 may have a length selected from a range of 2,000 feet to 25,000 feet, plus or minus 100 feet.

In some embodiments, a given section of vertical wellbore 5 may have a predetermined diameter. In some embodiments, a given section of vertical wellbore 5 may have a minimum predetermined diameter (e.g., to accommodate a given reaming tool 12 in its substantially collapsed/closed configuration). In some embodiments, a given section of vertical wellbore 5 may have a diameter selected from a range of ten (10) inches to thirty (30) inches, plus or minus one inch. In some embodiments, a given section of vertical wellbore 5 may have a diameter selected from a range of twelve (12) inches to thirty (30) inches, plus or minus one inch.

In some embodiments, reamer tool 12 (see e.g., FIG. 2) in an open or operational position may be too wide to traverse the relatively narrow diameter vertical wellbore 5. In some embodiments, in a closed position, reamer tool 12 may be lowered through vertical wellbore 5 to the desired depth for reaming out a given human-made cavern 14. The ability to insert reamer tool 12 through a relatively small diameter vertical wellbore 5, negates a need for larger diameter wellbores, from the surface to the desired depth, which would be operationally more difficult, more expensive, and more time-consuming in both materials and equipment. In addition, in a large diameter wellbore, it may be difficult to protect the near surface water-bearing zones or potable water tables for environmental safety since it is easier to "case" or line a smaller diameter wellbore with steel and/or cement than a larger diameter wellbore that may be 6 feet or more in diameter. Larger diameter wellbores are problematic near the surface since larger diameter steel cylinders are structurally weaker and prone to collapse when loaded laterally.

For example, and without limiting the scope of the present invention, in some embodiments, multiple initial vertical wellbore sections 5 may be drilled by conventional means from an initial vertical wellbore 5 as lateral wellbores which may have an S-shaped section leading to an additional separate vertical section capable of initiating and implementing the jet drilling equipment for forming a launch chamber 7 therein. See e.g., FIG. 1A and FIG. 3A of U.S. patent application Ser. No. 16/285,199 which show such S-shaped sections of wellbores.

Continuing discussing FIG. 1A, in some embodiments, once a given vertical wellbore 5 is formed from terrestrial ground-level 3 to disposal formation rock 15, equipment used to form vertical wellbore 5 may be removed from vertical wellbore 5. In some embodiments, then jet drilling equipment may be inserted and/or landed to a bottom and/or to a distal/terminal portion of vertical wellbore 5 in preparation of jet drilling operations to form a given launch chamber 7 therein. In some embodiments, the jet drilling equipment may comprise at least one jetting tool 10, at least one jet drill fluid pipe 9, a high-pressure conduit 6a, the jet drilling fluid, a supply/reservoir 2a of the jet drill fluid, a pumping means 2b, portions thereof, combinations thereof, and/or the like. Note, see FIG. 1B for jet fluid supply/reservoir 2a and pumping means 2b. In some embodiments, jet fluid supply/reservoir 2a and/or pumping means 2b may be located on and/or proximate to terrestrial ground-level 3. In some embodiments, jet fluid supply/reservoir 2a and pumping means 2b may be operatively connected to each other. In some embodiments, pumping means 2b and high-pressure conduit 6a may be operatively connected to each other. In some embodiments, high-pressure conduit 6a may be at least mostly located in the given vertical wellbore 5 during jet drilling operations. In some embodiments, high-pressure conduit 6a may be have two opposing terminal ends, with one being operatively connected to pumping means 2b and the other being operatively connected to jetting tool 10 and jet drill fluid pipe 9. In some embodiments, high-pressure conduit 6a may be configured for high pressure use. In some embodiments, high-pressure conduit 6a may be a means for moving the jetting fluid therein, while under high pressure, from jet fluid supply/reservoir 2a to jet drill fluid pipe 9. In some embodiments, pumping means 2b may pump the jetting fluid from jet fluid supply/reservoir 2a to jet drill fluid pipe 9, and may do while generating high pressures of the jetting fluid. In some embodiments, jet drill fluid pipe 9 may be at least mostly located within jetting tool 10. In some embodiments, jet drill fluid pipe 9 may have two opposing terminal ends, with one connecting to a terminal end of high-pressure conduit 6a and the other end terminating at a nozzle/orifice of jet drill fluid pipe 9, where the jetting fluid may be ejected a high-pressures into jet flow 11. In some embodiments, the nozzle/orifice of jet drill fluid pipe 9 may be located on an exterior vertical side of jetting tool 10. In some embodiments, the nozzle/orifice of jet drill fluid pipe 9 may be located on an exterior vertical side of jetting tool 10, closer to a bottom of jetting tool 10 than a top of jetting tool 10. In some embodiments, jet flow 11 may be directed at portions of disposal formation rock 15, wherein jet flow 11 may erode, cut, carve, excavate, combinations thereof, and/or the like at least portions of disposal formation rock 15 to form the given launch chamber 7. In some embodiments, the eroded, cut, carved, excavated, portions thereof, combinations thereof, and/or the like of disposal formation rock 15 may be shown as channel jetted 11a in the relevant figures.

Continuing discussing FIG. 1A, in some embodiments, a transverse cross-section through a given jetting tool 10 may have a dimension that is the same or smaller than a diameter of vertical wellbore 5, wherein this may facilitate insertion and landing of jetting tool 10 into a bottom of vertical wellbore 5. In some embodiments, a transverse cross-section through a given jetting tool 10 may be substantially circular in shape. In some embodiments, jetting tool 10 may be sized and shaped to be able to rotate/spin while in vertical wellbore 5.

Continuing discussing FIG. 1A, in some embodiments, a specialized high-pressure pipe system 6a is implemented internally to the initial vertical wellbore 5 to transport the abrasive jetting fluid from the surface reservoir apparatus 2a down the vertical wellbore 5 to the jet drill tool 10. In some embodiments, jet drill tool 10, which may be a substantially standard industry product, may have an internal section 9, herein referred to jet fluid pipe 9. In some embodiments, jet fluid pipe 9 may be curved to convert the downward vertical flow of the abrasive jetting fluid into a substantially horizontal jet flow 11 (spray) which may be configured to carve out and/or erode a channel jetted 11a as the abrasive jetting fluid 11 impacts portions of the disposal formation rock 15 at very high-pressures.

Continuing discussing FIG. 1A, in some embodiments, high-pressure conduit 6a may be selected from one or more of high-pressure jointed pipe, high-pressure coiled tubing, portions thereof, combinations thereof, and/or the like. in some embodiments, high-pressure conduit 6a may be to transport a predetermined/given jetting fluid, with or without abrasives, at relatively high pressures (e.g., about 5,000 psi [pounds per square inch] to about 20,000 psi, plus or minus 1,000 psi).

Continuing discussing FIG. 1A, in some embodiments, the jetting fluid that may be ejected from the nozzle/orifice of jetting tool 10/jet drill fluid pipe 9, may be at high-pressures. In some embodiments, the jetting fluid that may be ejected from the nozzle/orifice of jetting tool 10/jet drill fluid pipe 9, may be at predetermined high-pressures. In some embodiments, the jetting fluid may have predetermined properties and/or formulation. In some embodiments, the jetting fluid have abrasive additives included therein. In some embodiments, jet flow 11 may have an exit high-pressure of 5,000 psi (pounds per square inch) to 20,000 psi, plus or minus 1,000 psi.

In some embodiments, jet flow 11 may have an exit high-pressure of 20,000 psi.

Continuing discussing FIG. 1A, in some embodiments, jetting tool 10 may be operated and varied in a substantially vertical direction (up and/or down) within vertical wellbore 5 to form a predetermined height for the given launch chamber 7 to be formed. In FIG. 1A, reference numeral 10a may indicate an upper position of jetting tool 10 in vertical wellbore 5. In FIG. 1A, reference numeral 10b may indicate a lower position of jetting tool 10 in vertical wellbore 5.

In some embodiments, jetting tool 10 may also be rotated around a central longitudinal axis (e.g., around a longitudinal center of vertical wellbore 5 and/or of high-pressure conduit 6a) to help facilitate forming of the given launch chamber 7. See e.g., FIG. 1D. That is, in some embodiments, excavation using jetting tool 10 may occur in a vertical (up/down direction) as well in a radial and horizontal direction to form a given launch chamber 7. In some embodiments, that fully formed launch chamber 7 may be substantially cylindrical in shape with a volume 8. See e.g., FIG. 1A.

Continuing FIG. 1A, in some embodiments, jet drill tool 10 may be mechanically capable of moving in one or more planes to allow indexing of jet drill tool 10, which in turn may permit formation of a substantially cylindrical launch chamber 7. For example, and without limiting the scope of the present invention, jet drill tool 10 may be mechanically elevated from location/position 10a to location/position 10b (and/or vice-versa) as shown in the FIG. 1A, to cut a new channel jetted 11a at the new vertical location/position. These indexing/movement processes are discussed further in the discussions of FIG. 1D and FIG. 1E. In some embodiments, below the initial vertical wellbore 5, a given launch chamber 7 may be implemented by the sequential actions of jet drill tool 10, first by indexing in a horizontal plane (e.g., with jet drill tool 10 rotating) and then sequentially in a vertical plane (e.g., with jet drill tool 10 moving up and/or down). This type of horizontal and vertical carving or erosion is similar to the engineering actions used in many other industries and in the prior art, wherein a hollow cavity inside a solid object is implemented using mechanical means by a lathe or by electro-erosion processes, on a much smaller scale. The sequential indexing processes which are later shown in FIG. 1D and FIG. 1E are continued until the designed and/or predetermined dimensions are reached for the given launch chamber 7. In some embodiments, the volume (void) 8 may be with respect to interior volume of the given launch chamber 7. In some embodiments, the pre-determined dimensions of a given launch chamber 7 may be determined by the overall largest operational/open diameter of a given reamer tool 12 that may be desired to be used to form the given human-made cavern 14. In some embodiments, volume 8 of a given launch chamber 7 may have a predetermined diameter that is larger than a largest dimension of the at least one reaming tool 12, when the at least one reaming tool 12 is in an open configuration. In some embodiments, a plurality of channels jetted 11a together may form a given volume 8 of a given launch chamber 7.

Continuing discussing FIG. 1A, in some embodiments, volume 8 for a given launch chamber 7 may be predetermined. In some embodiments, volume 8 for a given launch chamber 7 may have a (horizontal) diameter (protruding horizontally into disposal formation rock 15) selected from a range of four (f) feet to ten (10) feet, plus or minus one (1) foot. In some embodiments, volume 8 for a given launch chamber 7 may have a (vertical) height (protruding towards into disposal formation rock 15) selected from a range of six (6) feet to twelve (12) feet, plus or minus one (1) foot. In other embodiments, volume 8 may be other predetermined dimensions.

Continuing discussing FIG. 1A, in some embodiments, various surface facilities 2 may be located on terrestrial ground-level 3. In some embodiments, associated usually, at nearby/proximate locations close to the drill rig 1, may be surface facilities 2 for the jet drilling system. In some embodiments, surface facilities 2 may comprise one or more: jet fluid supply/reservoir 2a, pumping means 2b, buildings, structures, sheds, storage areas, staging areas, personnel accommodations, portions thereof, combinations thereof, and/or the like. Note, see FIG. 1B for jet fluid supply/reservoir 2a and pumping means 2b.

Continuing discussing FIG. 1A, in some embodiments, vertical wellbore 5 may pass through various near surface formation 4. In some embodiments, disposal formation rock 15 may be located below and/or beneath near surface formation(s) 4. In some embodiments, near surface formation(s) 4 may be disposed between terrestrial ground-level 3 and disposal formation rock 15. In some embodiments, human-made cavern(s) 14 may not be suitable for being located in near surface formation(s) 4 (e.g., because of increased environmental and/or water contamination risks associated with storing waste materials 17 in near surface formation(s) 4).

Figure 1B:
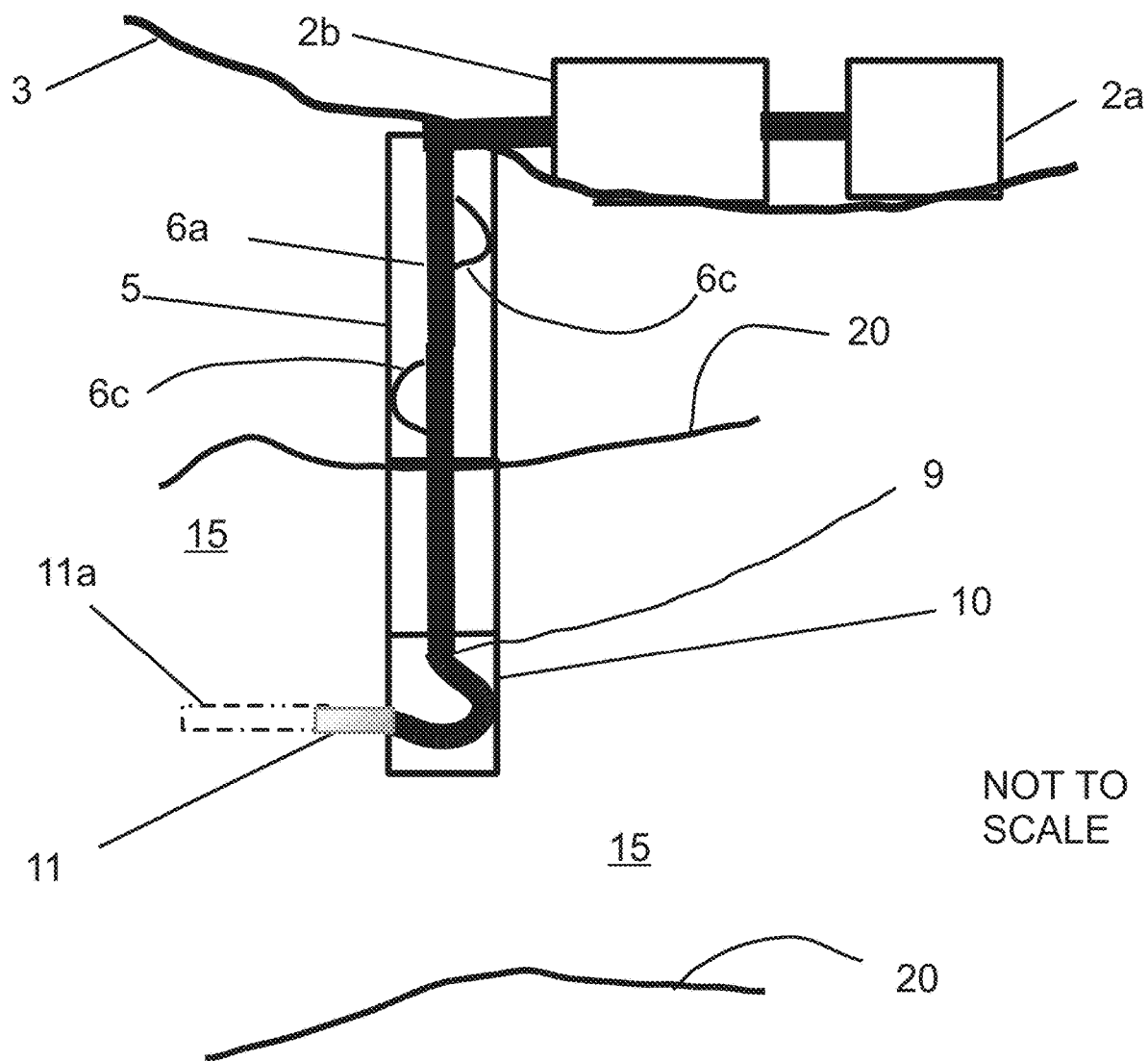
FIG. 1B may show a schematic side view of various components that may be used in some embodiments of the invention with respect to forming a launch chamber, wherein jet drilling may be used to form the given launch chamber.

FIG. 1B may show a schematic side view of various components that may be used in some embodiments of the invention with respect to forming a given launch chamber 7, wherein jet drilling may be used to form the given launch chamber 7. FIG. 1B differs from FIG. 1A by FIG. 1B showing jet fluid supply/reservoir 2a and pumping means 2b, both of which are noted above. In some embodiments, pumping means 2b may comprise at least one pump. In some embodiments, pumping means 2b may comprise one or more pumps. In some embodiments, pumping means 2b may comprise two or more pumps. In some embodiments, at least one pump of pumping means 2b may be configured to pump the jetting fluid (which may be abrasive) from jet fluid supply/reservoir 2a, to high-pressure conduit 6a, and to jet drill fluid pipe 9.

In some embodiments, most of the jetted fluid expelled from jetting tool 10, may collect inside the growing launch chamber 7 space (volume 8) and accumulate in the lower portion of the growing launch chamber 7 as the jet process continues and jetting tool 10 moves upwards in wellbore 5. This small amount of expelled jetted liquid with formation 15 particulate will not have any undesirable effects of the very high pressure jetted fluid which is being pumped through the jet nozzle(s) of jetting tool 10 to carve out the void in the formation rock 15. In some embodiments, the expelled jet fluid is usually not pumped back to the surface 3. In some embodiments, the expelled jet fluid just remains in the bottom of the launch chamber 7 area and wellbore 5 and may be removed after, if so desired or needed. In some embodiments, the expelled jet fluid will not affect the jetting nor drilling operations. In some embodiments, the launch chamber 7 may be substantially full of drilling mud when the reaming process begins for the human-made cavern 14 construction operations and the big reamer 12 is in operation. In general, all downhole operations may occur with substantially full or nearly liquid filled wellbores/chambers/caverns.

However, in some embodiments, at least one pump of pumping means 2b may be configured to pump expelled (effluent) jetting fluid (that has exited jet drill fluid pipe 9 as jet flow 11) back through a portion of jet drill fluid pipe 9, through a portion of high-pressure conduit 6a, and back to terrestrial ground-level 3. In such embodiments, jet drill fluid pipe 9 and/or high-pressure conduit 6a may comprise at least two separate fluid pathways configured for moving fluids, at high-pressures, in substantially opposing directions. In some embodiments, this effluent may also comprise portions of the eroded disposal formation rock 15 (that were eroded by jet flow 11).

Continuing discussing FIG. 1B, in some embodiments, a given jetting tool 10 may be connected to at least one high-pressure conduit 6a, wherein the at least one high-pressure conduit 6a may run from the given jetting tool 10 to terrestrial surface 3, with portions of the at least one high-pressure conduit 6a passing through at least one wellbore 5 to pumping means 2b; wherein by use of pumping means 2b, the at least one high-pressure conduit 6a may be configured to transport (and may transport) the jetting fluid, under high-pressure, from jetting fluid reservoir 2a to the given jetting tool 10, wherein jetting fluid reservoir 2a may be operatively connected to the pumping means 2b. In some embodiments, the jetting fluid may comprises at least one abrasive additive, wherein the jetting fluid may be configured to assist with mechanical and/or chemical erosion of regions of a geological formation that come into contact with the jetting fluid when the jetting fluid is under high-pressure. In some embodiments, a given jetting tool may comprise at least one nozzle/orifice that may be configured to deliver/discharge/eject the jetting fluid at high-pressure towards regions of the geological formation resulting in erosion of at least some of those regions of the geological formation. In some embodiments, this geological formation may be axially surrounding bottom/distal/terminal portions of wellbore 5. In some embodiments, this geological formation that a given launch chamber 7 may be formed from and/or where jet drilling operations may be directed to, may be portions of disposal formation rock 15 (deep geological formation). In some embodiments, this geological formation that a given launch chamber 7 may be formed from and/or where jet drilling operations may be directed to, may not be portions of disposal formation rock 15 (deep geological formation), i.e., may be some other formation.

Continuing discussing FIG. 1B, in some embodiments, the jetting drilling system may comprise at least one jet drill conduit centralizer 6c. In some embodiments, jet drill conduit centralizer 6c may be configured to assist portions of high-pressure conduit 6a to be positioned substantially centrally within its outer wellbore 5. In some embodiments, disposed around axial side(s) of a portion of high-pressure conduit 6a may be at least one jet drill conduit centralizer 6c. In some embodiments, a given jet drill conduit centralizer 6c may be in operative communication with a portion of high-pressure conduit 6a. In some embodiments, a given jet drill conduit centralizer 6c may be physically touching a portion of high-pressure conduit 6a. In some embodiments, a given jet drill conduit centralizer 6c may be attached to a portion of high-pressure conduit 6a. In some embodiments, a given jet drill conduit centralizer 6c may be disposed between a portion of high-pressure conduit 6a and a portion of proximate wellbore 5.

In some embodiments, the reaming system may comprise at least one jet drill conduit centralizer 6c. In some embodiments, jet drill conduit centralizer 6c may be configured to assist portions of drill pipe apparatus 6b to be positioned substantially centrally within its outer wellbore 5. In some embodiments, disposed around axial side(s) of a portion of drill pipe apparatus 6b may be at least one jet drill conduit centralizer 6c. In some embodiments, a given jet drill conduit centralizer 6c may be in operative communication with a portion of drill pipe apparatus 6b. In some embodiments, a given jet drill conduit centralizer 6c may be physically touching a portion of drill pipe apparatus 6b. In some embodiments, a given jet drill conduit centralizer 6c may be attached to a portion of drill pipe apparatus 6b. In some embodiments, a given jet drill conduit centralizer 6c may be disposed between a portion of drill pipe apparatus 6b and a portion of proximate wellbore 5.

Figure 1C:
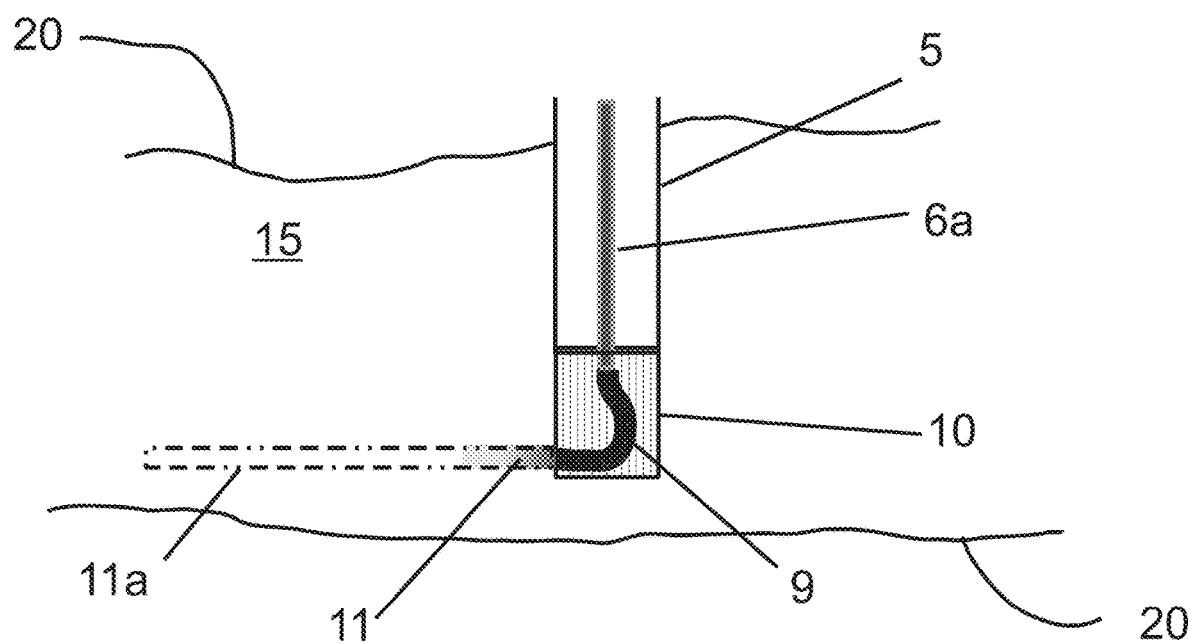
FIG. 1C may show a schematic side view of distal portions of a jet drilling system used to form a given launch chamber.
Figure 1E:
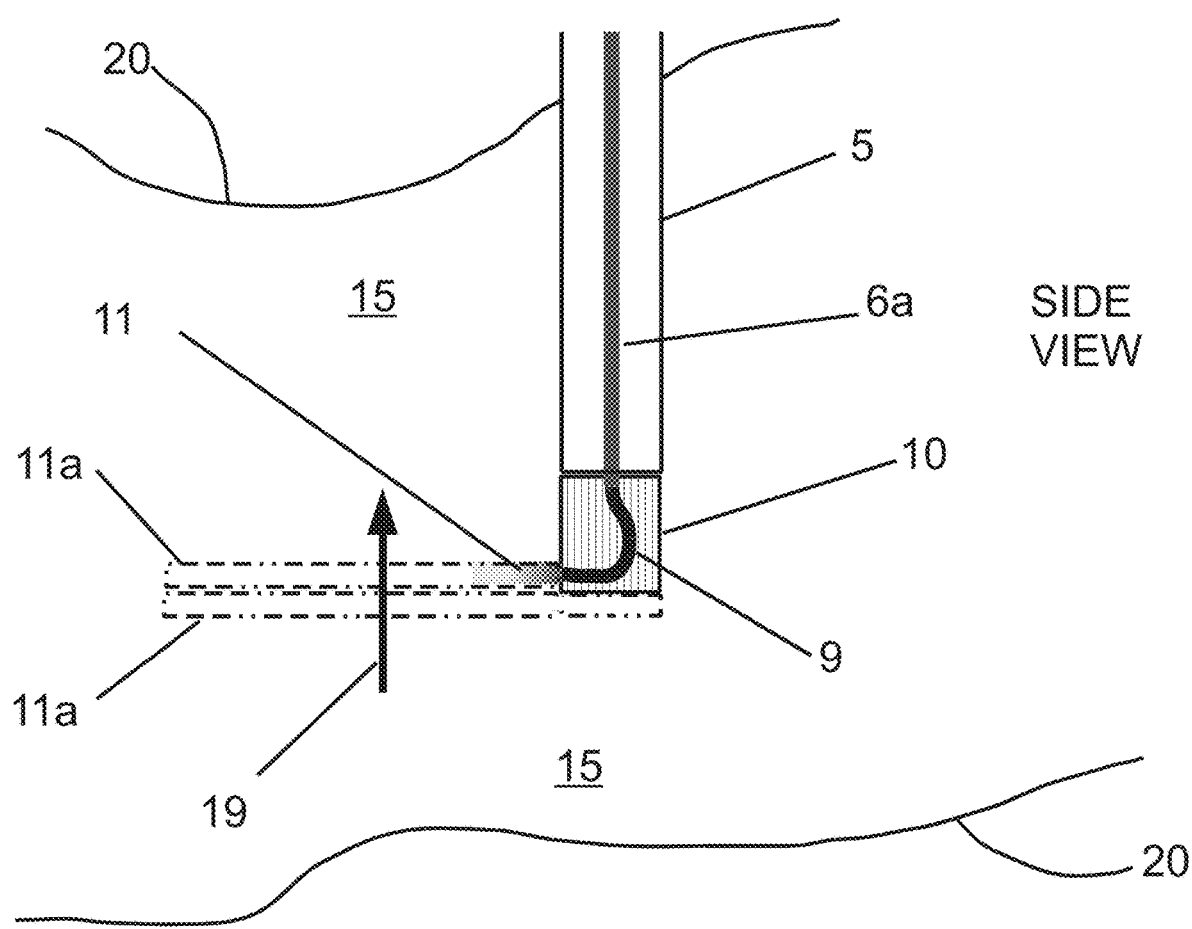
FIG. 1E may show a schematic side view of a jetting tool and its vertical (up and/or down) indexed movements, wherein such movements in part may facilitate forming the given launch chamber.

FIG. 1C may show a schematic side view of distal portions of a jet drilling system used to form a given launch chamber 7. FIG. 1C may show jet flow 11 being expelled at high-pressure from an orifice/nozzle of jet drill fluid pipe 9 of jetting tool 10, to erode a portion of disposal formation rock 15 forming a given channel jetted 11a. In some embodiments, during such jet drilling operations, jetting tool 10 may be moved up and/or down and rotationally (around a central longitudinal axis of vertical wellbore 5 and/or of high-pressure conduit 6a) forming a plurality of channels jetted 11a, wherein this plurality of channels jetted 11a may form volume 8 of a given launch chamber 7, that may be substantially cylindrical in overall shape. In some embodiments, a given channel jetted 11a formed from jet flow 11 may be substantially linear, parallel, colinear, and in linear alignment a longitudinal axis of jet flow 11. In some embodiments, as jetting tool 10 moves up and/or down, channels jetted 11a may be substantially as a vertical planar sheet of void (eroded) space; whereas, as jetting tool 10 moves rotationally, channels jetted 11a may form a substantially horizontal disk/disc of void (eroded) space. These eroded void spaces may form volume 8 of a given launch chamber 7.

FIG. 1D may show a top-down schematic view or a transverse-cross-sectional schematic view of/through jetting tool 10 and its horizontal (and rotational) indexed movements, wherein such movements in part may facilitate forming the given launch chamber 7. In some embodiments, by rotationally indexing the jetting tool 10, in a given horizontal plane, around a central longitudinal axis of vertical wellbore 5 and/or of high-pressure conduit 6a, the high-pressure (abrasive) jet flow 11 can be indexed in a rotational and horizontal manner shown via the direction arrow 18. In some embodiments, by repeating this indexing process in a complete 360-degree circle within that given horizontal plane, a substantially horizontal disk/disc of void (eroded) space may be formed in disposal formation rock 15. A height of such a substantially horizontal disk/disc of void (eroded) space may be about a diameter of jet flow 11.

FIG. 1E may show a schematic side view of jetting tool 10 and its vertical (up and/or down) indexed movements, wherein such movements in part may facilitate forming the given launch chamber 7. In some embodiments, by vertically indexing jetting tool 10, the high-pressure (abrasive) jet flow 11 may be indexed in a vertical manner shown via the direction arrow 19 to a higher location 10a. In some embodiments, such vertical indexing of jetting tool 10 may occur in a given substantially vertical axis, that in turn may then form a substantially vertical planar sheet of void (eroded) space in disposal formation rock 15.

In some embodiments, jetting tool 10 may begin jet drilling at a bottom location of vertical wellbore 5 and may be first indexed rotationally and horizontally according to direction 18 and only after 360 degrees of jet drilling has been completed resulting in formation of a first substantially horizontal disk/disc of void (eroded) space, may jetting tool 10 then be indexed vertically according to direction 19; wherein at this new vertical height a new substantially horizontal disk/disc of void (eroded) space may be formed on top of the prior/first substantially horizontal disk/disc of void (eroded) space; and then once this latest substantially horizontal disk/disc of void (eroded) space may be formed, jetting tool 10 may be indexed vertically again to another new height and yet another substantially horizontal disk/disc of void (eroded) space may be formed; and this process of horizontal/rotational indexing followed by vertical indexing may continue until a full/complete volume 8 may be formed for a given launch chamber 7, wherein volume 8 may be substantially shaped as a hollow cylinder. See e.g., FIG. 1D, FIG. 1E, and FIG. 1A.

In some embodiments, the vertical indexing process, jetting tool 10 may always be pulled vertically upwards to maintain tension in the jet drill system, since pushing down on the downhole jet drilling system may be mechanically ineffective. Whereas, in other embodiments, vertical indexing may occur in up or down vertical directions.

Figure 1F:
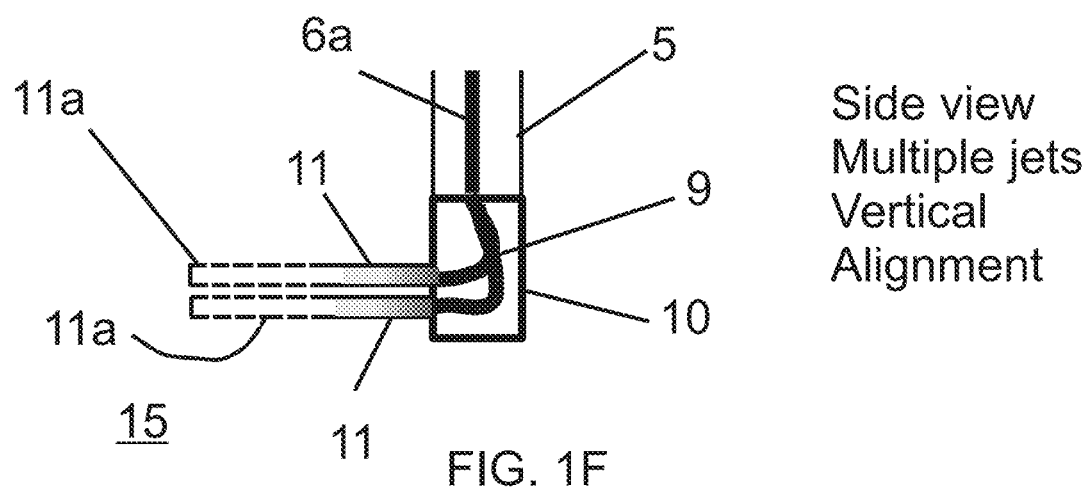
FIG. 1F may show a schematic side view of a jetting tool with at least two jets, wherein the at least two jets may be vertically stacked with respect to each other.

FIG. 1F may show a schematic side view of a jetting tool 10 with at least two jets, wherein the at least two jets may be vertically stacked with respect to each other. In some embodiments, a distal/terminal portion of jet drill fluid pipe 9 may terminate in at least two different orifices/nozzles, configured to direct and emit two different jet flows 11. In some embodiments, jetting tool 10 may have on its exterior side at least two different orifices/nozzles, configured to direct and emit two different jet flows 11. In some embodiments, the two orifices/nozzles may be fixedly located side by side with each other. In some embodiments, the two orifices/nozzles may be fixedly vertically stacked with respect to each other.

In practice operationally higher pump pressures may be needed as a quantity of jet flows 11 may be increased for channel jetted 11a development in disposal formation rock 15.

Figure 1G:
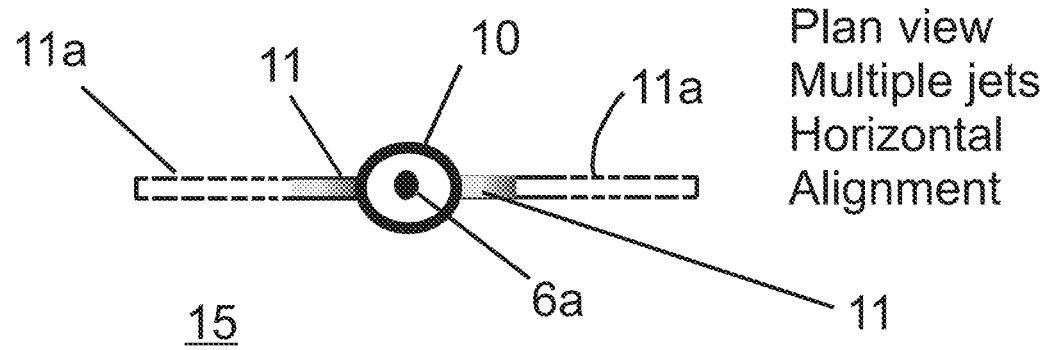
FIG. 1G may show a schematic top view of a jetting tool with at least two jets, wherein the at least two jets may be horizontally and oppositely disposed with respect to each other.

FIG. 1G may show a schematic top view of a jetting tool 10 with at least two jets, wherein the at least jets may be horizontally and oppositely disposed with respect to each other. In some embodiments, a distal/terminal portion of jet drill fluid pipe 9 may terminate in at least two different orifices/nozzles, configured to direct and emit two different jet flows 11. In some embodiments, jetting tool 10 may have on its exterior side at least two different orifices/nozzles, configured to direct and emit two different jet flows 11. In some embodiments, the two orifices/nozzles may be fixedly located on opposing sides of jetting tool 10 with respect to each other. In some embodiments, in a given horizontal plane the two opposing jet flows 11 from the two opposing orifices/nozzles may be erode disposal formation rock 15 in opposite directions from each other. In practice operationally higher pump pressures may be needed as a quantity of jet flows 11 may be increased for channel jetted 11a development in disposal formation rock 15.

In some embodiments, the teachings of FIG. 1F and FIG. 1G may be combined providing for a four jet embodiment, wherein the opposing sides of jetting tool 10 each may comprise a pair of vertically stacked orifices/nozzles for jet flows 11.

Use of multiple jets may make forming a given launch chamber 7 faster and more efficient. See e.g., FIG. 1F and/or FIG. 1G.

Figure 1H:
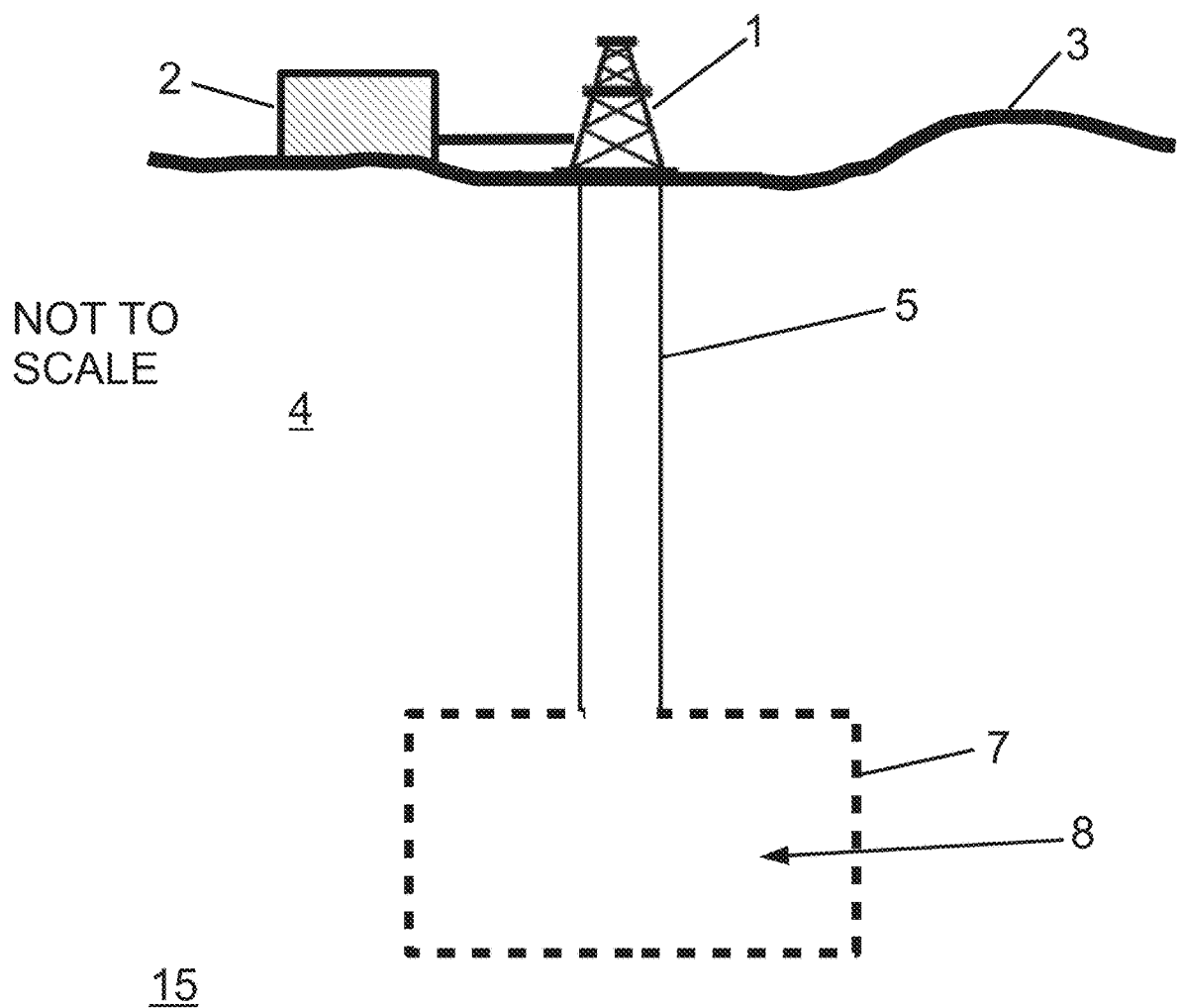
FIG. 1H may show a schematic side view of a completed launch chamber.

FIG. 1H may show a schematic side view of a completed launch chamber 7. Note in FIG. 1H the jet drilling equipment has been removed from launch chamber 7 and its associated (connected) vertical wellbore 5. Launch chamber 7 as shown in FIG. 1H may now be ready to receive a given reamer tool 12 (in a non-deployed/non-expanded configuration).

Figure 2:
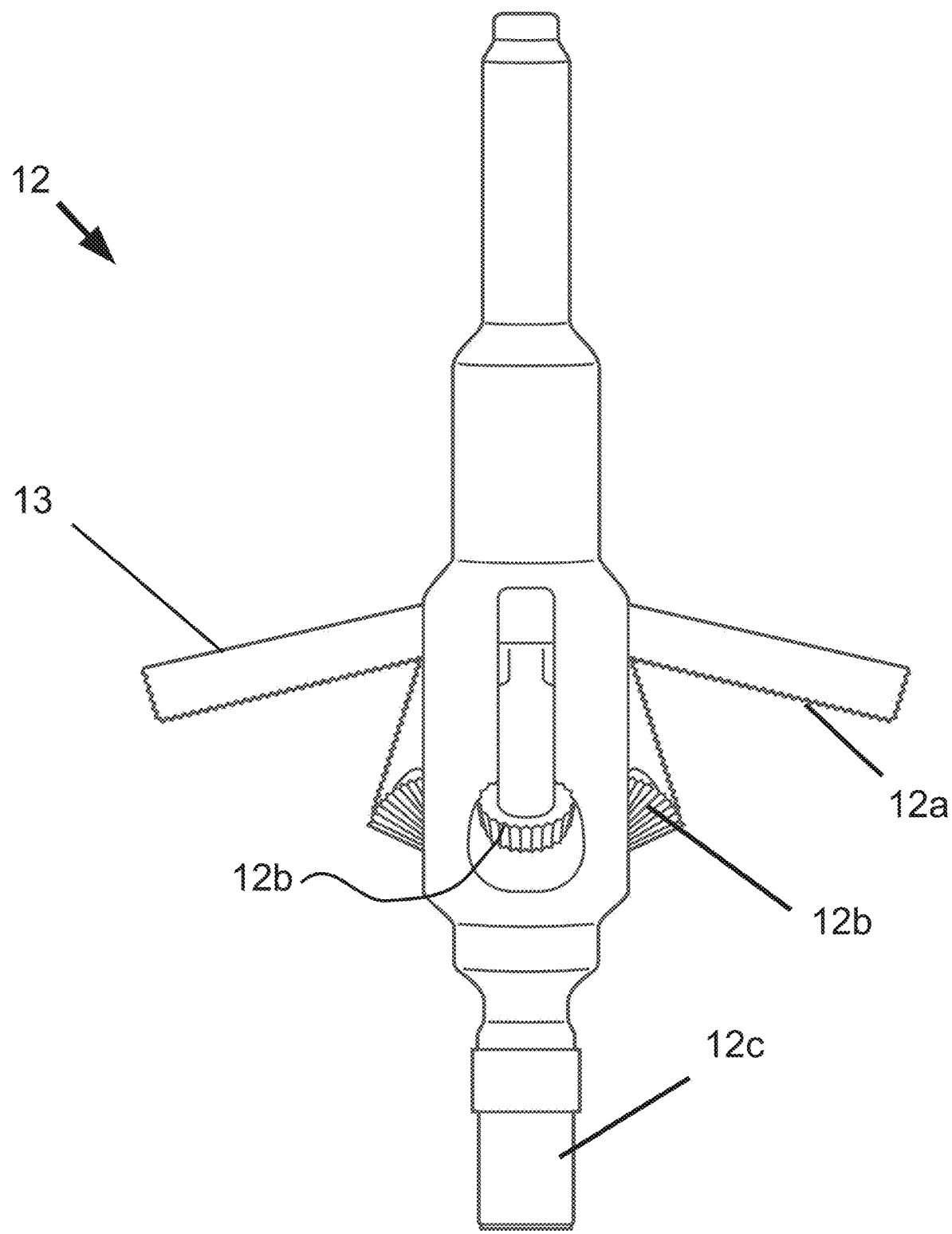
FIG. 2 may show a schematic side view of at least a portion of a reamer tool.

FIG. 2 may show a schematic side view of at least a portion of a reamer tool 12. In some embodiments, reamer tool 12 may be a type of downhole drill device. In some embodiments, reamer tool 12 may be used to enlarge a borehole below a point during well drilling operations. In some embodiments, reamer tool 12 may be strategically positioned either above a drill bit or above a specialized bottom hole assembly run inside an existing borehole (such as vertical wellbore 5). Preexisting reamer tools may be used in existing oil-field drilling operation and may exist in numerous designs and in sizes varying from a few inches to more than 60 inches (in an undeployed configuration) for a given reaming tool. In some embodiments, reamer tool 12 may be substantially similar to such preexisting reamer tools used in oil drill operations.

Continuing discussing FIG. 2, reamer tool 12 may be comprised of a body extensible (pivotable) mobile parts and/or cutting devices. In some embodiments, reamer tool 12 may comprise at least one large diameter moveable cutting arm 12a and/or at least one small diameter moveable cutting arm 12b. In some embodiments, the cutting devices may comprise at least one large diameter moveable cutting arm 12a and/or at least one small diameter moveable cutting arm 12b. In some embodiments, the cutting devices, large diameter moveable cutting arm 12a, small diameter moveable cutting arm 12b, may comprise moving parts, arms, blocks, blades, cutters, portions thereof, combinations thereof, and/or the like. In some embodiments, "large" and "small" with respect to large diameter moveable cutting arm 12a and small diameter moveable cutting arm 12b may be with respect to each other. That is, large diameter moveable cutting arm 12a may have larger diameter cutters than small diameter moveable cutting arm 12b. That is, small diameter moveable cutting arm 12b may have smaller diameter cutters than large diameter moveable cutting arm 12a.

Continuing discussing FIG. 2, in some embodiments, reamer tool 12 may have three such cutting devices of large diameter moveable cutting arm 12a and small diameter moveable cutting arm 12b.

Continuing discussing FIG. 2, in some embodiments, these cutting devices, large diameter moveable cutting arm 12a and small diameter moveable cutting arm 12b, may exist in two main configurations, an open configuration and a closed configuration. In some embodiments, a body of reamer tool 12 may comprise expandable and retractable cutting arm(s) 13. In some embodiments, expandable and retractable cutting arm(s) 13 may comprise large diameter moveable cutting arm 12a and/or small diameter moveable cutting arm 12b. In some embodiments, reamer tool 12 may exist in the two main configurations, the open configuration and the closed configuration. FIG. 2 may show both configurations simultaneously; however, in reality reamer tool 12 would only exist one or the other configuration, i.e., the two configurations are mutually exclusive. In some embodiments, the closed configuration may be for moving/transporting reamer tool 12 within confined spaces; whereas, the open configuration may be for active under-reaming operations to enlarge confined spaces. In some embodiments, reamer tool 12 may be transition from the closed configuration to the open configuration; and/or may transition from the open configuration to the closed configuration.

Continuing discussing FIG. 2, in some embodiments, in the closed configuration, the cutting devices, large diameter moveable cutting arm 12a and small diameter moveable cutting arm 12b, may be substantially retracted to the body of reamer tool 12, which in turn may provide for an overall smaller diameter of reamer tool 12 while in this closed configuration. In some embodiments, this closed configuration of reamer tool 12 may be used during descent (or ascent) into a given wellbore, such as vertical wellbore 5. In some embodiments, an overall diameter of reamer tool 12, when reamer tool 12 may be in the closed configuration, may be sized/dimensioned to fit within a diameter of vertical wellbore 5. In some embodiments, the closed configuration of reamer tool 12 may be useful for moving reamer tool 12 within a given wellbore (e.g., vertical wellbore 5).

For example, and without limiting the scope of the present invention, with reamer tool 12 in the closed configuration, reamer tool 12 may be moved into a desired location within a given wellbore (e.g., vertical wellbore 5) and/or within a formed launch chamber 7, where under-reaming operations are to occur.

For example, and without limiting the scope of the present invention, with reamer tool 12 in the closed configuration, reamer tool 12 may be moved into a formed launch chamber 7 where reamer tool 12 may now have sufficient room to extend and/or deploy into its open configuration.

For example, and without limiting the scope of the present invention, with reamer tool 12 in the closed configuration, reamer tool 12 may be removed from a location within a given wellbore (e.g., vertical wellbore 5), from a launch chamber 7, and/or from a human-made cavern 14) where under-reaming operations have already occurred.

Continuing discussing FIG. 2, in some embodiments, reamer tool 12 may transition from its closed configuration to its open configuration, by at least one predetermined input. In some embodiments, the at least one predetermined input may be one or more of: a received optical signal; a received electronic signal; a received electromagnetic signal; a received mechanical input; a received fluid pressure input; portions thereof; combinations thereof; and/or the like. In some embodiments, the received electromagnetic signal may be from a RFID (radio frequency identification) tag that may be proximate to reamer tool 12. In some embodiments, energy and/or power for opening into the open configuration and/or for operating once in the open configuration may come from hydraulic pressure supplied to the given reamer tool 12, via drill pipe apparatus 6b, and from surface located pumping means 2b and/or the like. In some embodiments, the under-reaming system may be activated by a pre-programmed RFID tag, sent down the wellbore to the reamer apparatus to trigger reamer activity via a reamer control module which may energize the reamer's the cutter system.

Note, the reaming technology is such that today (2020) multiple reamers may be run in tandem and they may be independently controlled to allow rapid and efficient under-reaming of disposal formation rock 15 up to a prescribed (predetermined) designed diameter to form a given human-made cavern 14.

In some embodiments, reamer tool 12 may be connected to one or more drill strings. In some embodiments, reamer tool 12 may be connected to one or more drill pipe apparatus 6b (a portion of which may be a drill string). In some embodiments, drill pipe apparatus 6b may be used to move a given attached reamer tool 12 vertically up and/or down.

Figure 3A:
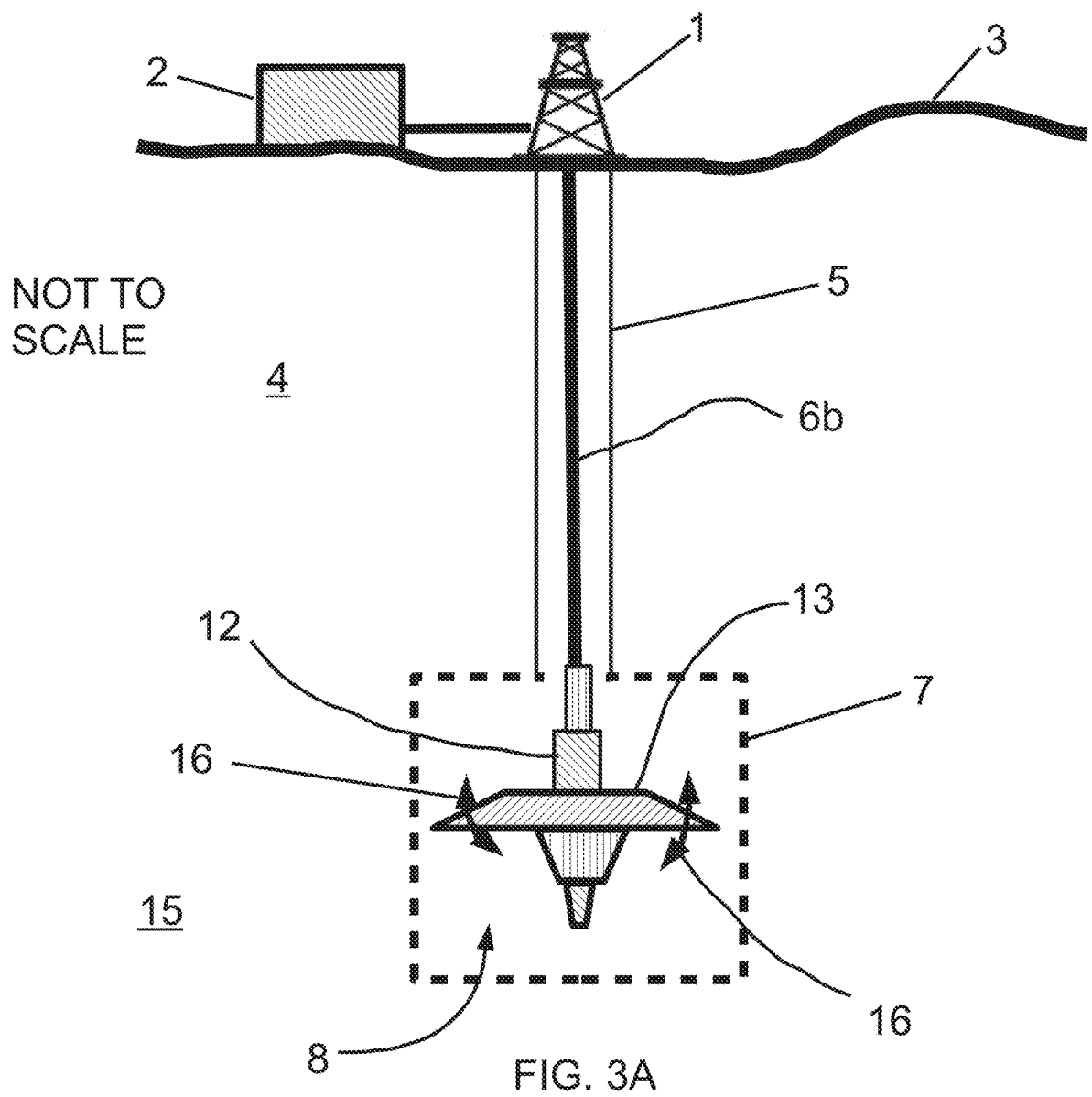
FIG. 3A may show a schematic side view of a formed launch chamber, wherein a reamer tool has been inserted/positioned therein.

FIG. 3A may show a schematic side view of a formed launch chamber 7, wherein reamer tool 12 has been inserted/positioned/located therein. Aspects of the launch chamber 7, including its formation, are discussed above in the discussions of FIG. 1A through FIG. 1H. Aspects of reamer tool 12 are discussed above in the discussion of FIG. 2. In some embodiments, moving and/or locating a given reamer tool 12 into a formed launch chamber 7, may be done by moving reamer tool 12 in its closed configuration through vertical wellbore 5 (that is attached to launch chamber 7) until reaching launch chamber 7. FIG. 3A presumes launch chamber 7 has been previously formed (e.g., according to FIG. 1A through FIG. 1H) and that the jet drilling equipment has been removed from vertical wellbore 5 and its attached launch chamber 7. In some embodiments, moving and/or locating a given reamer tool 12 into a formed launch chamber 7, may then provide sufficient space for reamer tool 12 to transition between closed configuration and the open configuration; and/or vice versa. In some embodiments, volume 8 (of launch chamber 7) may be larger than a greatest transverse/horizontal dimension of reamer tool 12 in its open configuration.

Continuing discussing FIG. 3A, in some embodiments, reaming tool 12 may be connected to the surface equipment on rig 1 by drill pipe tubulars 6b. In some embodiments, drill pipe tubulars 6b may include oil industry-standard drilling tubulars and/or heavy weight drill collars. In some drilling situations the reaming tool 12 may be connected to a down hole unit which may comprise a downhole motor and geo-steering systems, wherein such equipment may be standard and well understood in the oil drilling industry today [2020].

Figure 3B:
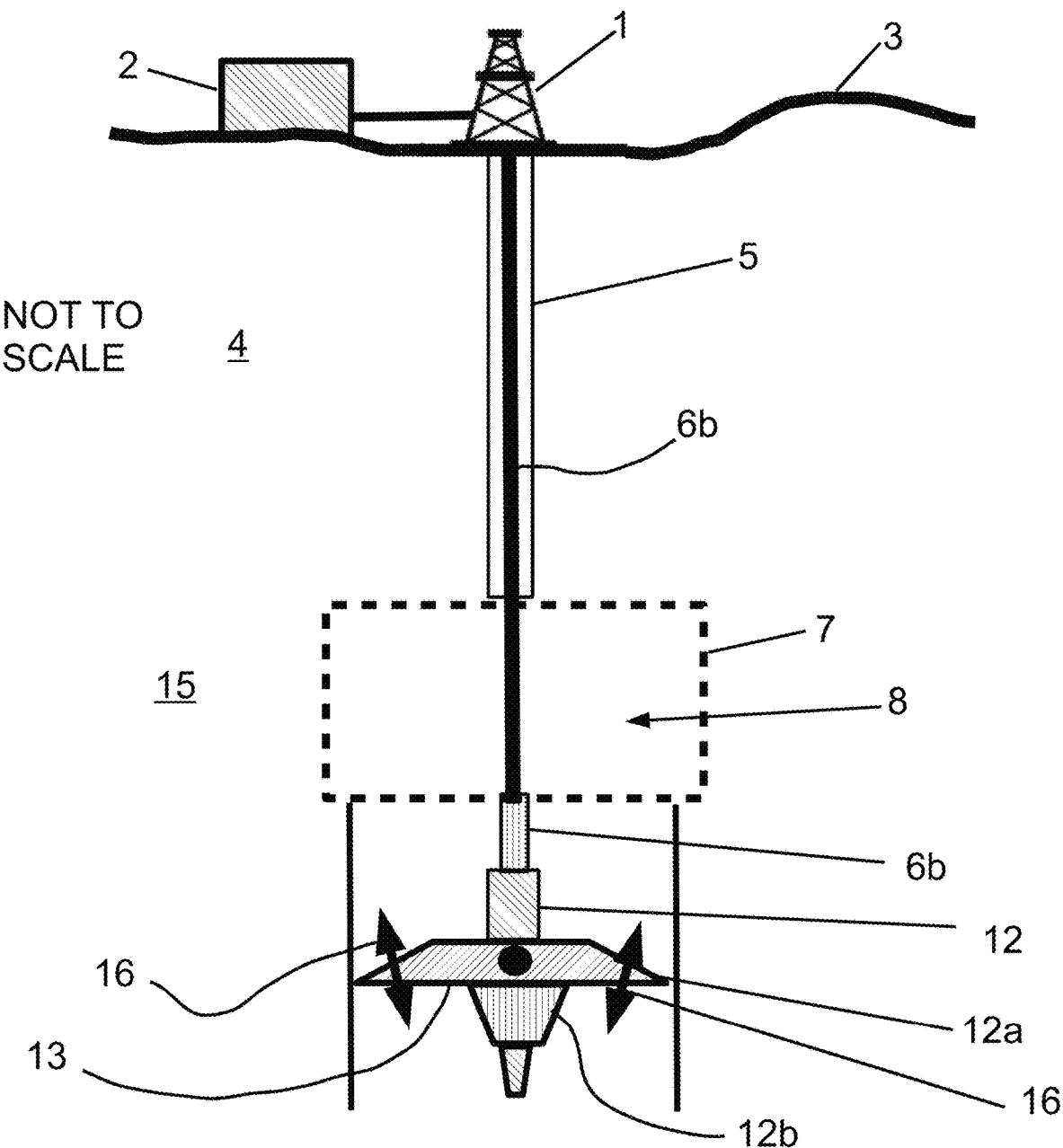
FIG. 3B may show a schematic side view of a formed launch chamber and at least a portion of a given human-made cavern, wherein a reamer tool may be operating (e.g., under-reaming) to form that given human-made cavern.

FIG. 3B may show a schematic side view of a formed launch chamber 7 and at least a portion of a given human-made cavern 14, wherein reamer tool 12 may be operating (e.g., under-reaming) to form that given human-made cavern 14. In some embodiments, reamer tool 12 may have been deployed/extended into its open configuration in launch chamber 7 and then under-reaming operations may have begun directed at a bottom of launch chamber 7 to begin forming the given human-made cavern 14. FIG. 3B may show the reamer tool 12, in its open configuration, under-reaming and forming the given human-made cavern 14. In some embodiments, during the under-reaming operations for forming a given human-made cavern 14, the expandable and retractable cutting arm 13, large diameter moveable cutting arm 12a, and/or small diameter moveable cutting arm 12b may be moving at least partially in a direction of movement 16. In some embodiments, direction of movement 16 may be substantially up and/or down movement.

Figure 3C:
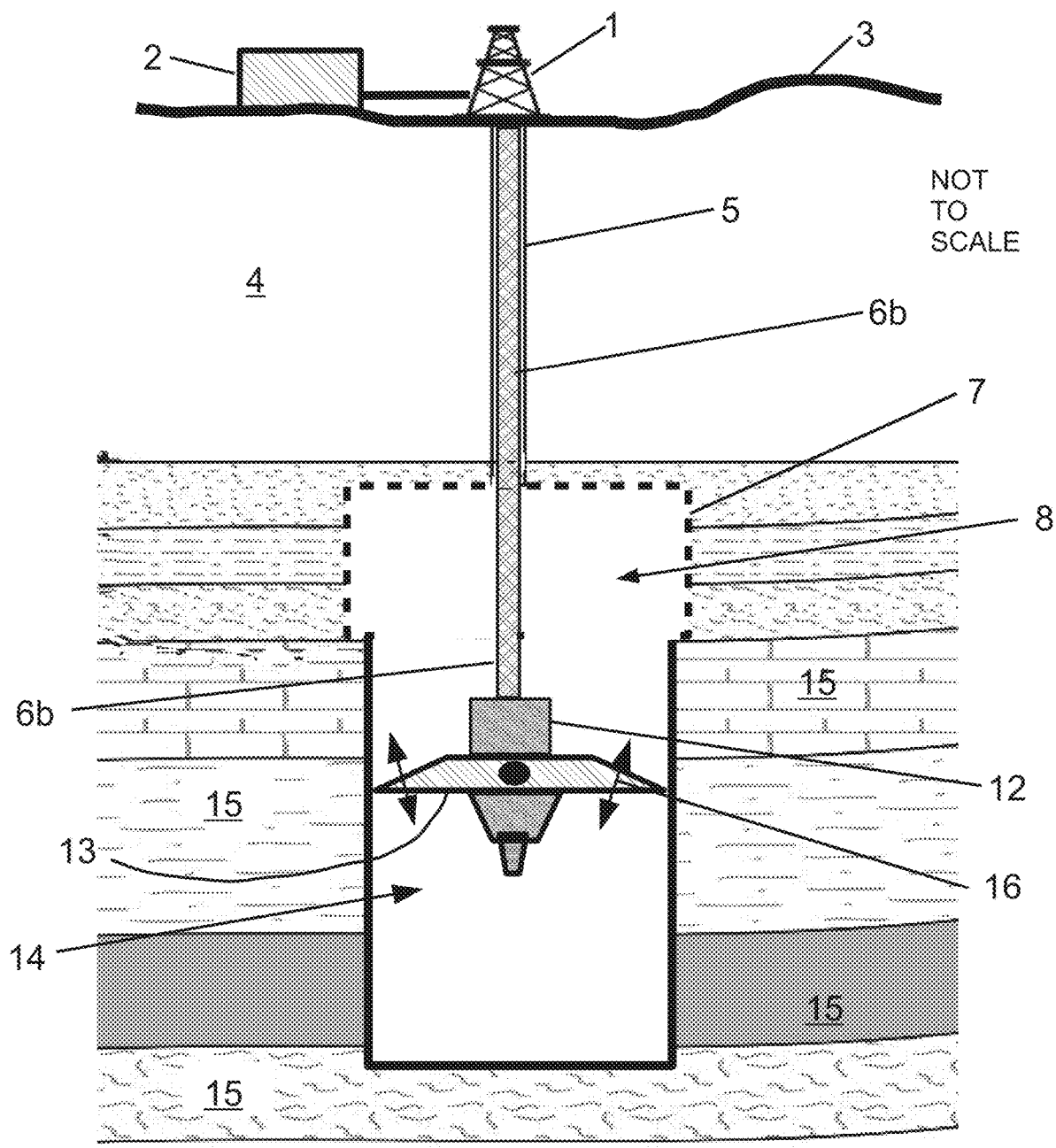
FIG. 3C may show a schematic side view of a formed launch chamber and a formed human-made cavern, wherein a reamer tool may have formed that given human-made cavern.

FIG. 3C may show a schematic side view of a formed launch chamber 7 and a formed human-made cavern 14, wherein reamer tool 12 may have formed that given human-made cavern 14. In some embodiments, a given human-made cavern 14 may be located vertically below a given launch chamber 7. In some embodiments, a bottom of a given launch chamber 7 may transition into a top of a given human-made cavern 14. In some embodiments, an open bottom of a given launch chamber 7 may transition into an open top of a given human-made cavern 14. In some embodiments, a given launch chamber 7 may be attached to a given human-made cavern 14. In some embodiments, a pair of attached launch chamber 7 and human-made cavern 14 may share a common longitudinal axis. In some embodiments, a diameter of human-made cavern 14 may be the same or less than a diameter of launch chamber 7.

Continuing discussing FIG. 3C, in some embodiments, human-made cavern 14 may be reamed out to its desired dimensions up to about 10,000 feet plus or minus 1,000 feet in vertical length (e.g., extending down into disposal formation rock 15); and/or up to 10 feet in diameter plus or minus one (1) foot (e.g., extending horizontally out into disposal formation rock 15). In some embodiments, a given human-made cavern 14 may have a fixed diameter that is selected from a range of three (3) feet to ten (10) feet, plus or minus one (1) foot. In some embodiments, a given human-made cavern 14 may have a fixed diameter that is selected from a range of three (3) feet to ten (10) feet, plus or minus six (6) inches. In some embodiments, a given human-made cavern 14 may have a fixed length that extends into the deep geological formation 15, wherein the fixed length is selected from a range of 1,000 feet to 10,000 feet, plus or minus one hundred (100) feet. In some embodiments, a given human-made cavern 14 may be substantially surrounded by a given deep geological formation 15. At a termination of the reaming process, reaming tool 12 may be transitioned into its closed configuration and pulled back to terrestrial surface-level 3 using drill pipe apparatus/tubulars 6b (e.g., drill string(s)) through human-made cavern 14, launch chamber 7, and/or the attached vertical wellbore 5.

With respect to FIG. 3C, now that the given human-made cavern 14 has been formed, reamer tool 12 may be transitioned back into its closed configuration and removed from human-made cavern 14, launch chamber 7, and its attached vertical wellbore 5. Once reamer tool 12 has been so fully removed, human-made cavern 14 may be pretreated/preconditioned for receiving waste material(s) 17; and/or waste material(s) 17 may be added to human-made cavern 14 for long-term disposal and/or storage therein, see e.g., FIG. 4.

Figure 4:
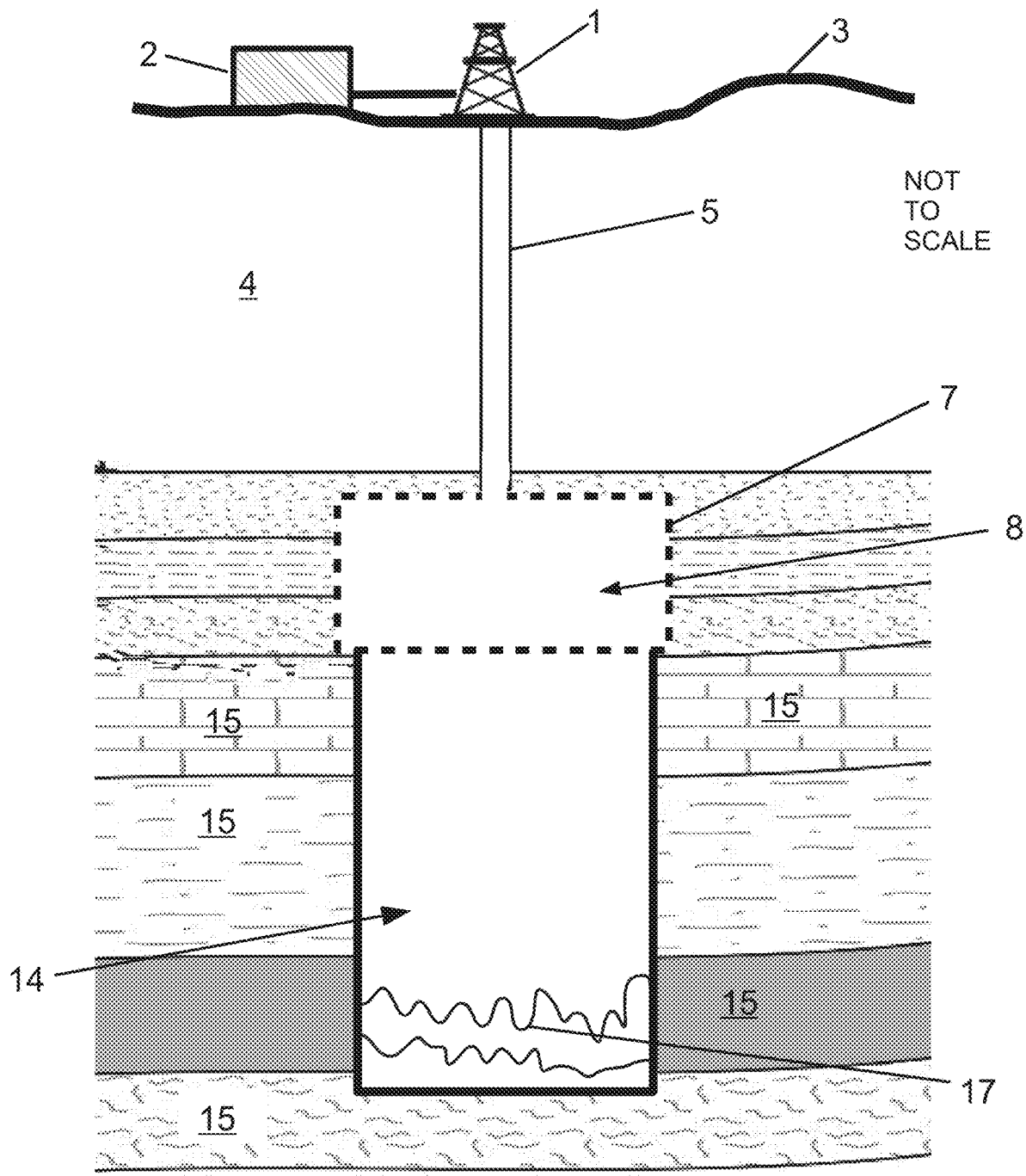
FIG. 4 may show a schematic side view of a formed launch chamber and a formed human-made cavern, wherein waste material(s) may now be loaded into that formed human-made cavern.

FIG. 4 may show a schematic side view of a formed launch chamber 7 and a formed human-made cavern 14, wherein waste material(s) 17 may now be loaded into that formed human-made cavern 14. In some embodiments, prior to loading waste material(s) 17 into human-made cavern 14, human-made cavern 14 may be pretreated/preconditioned for receiving waste material(s) 17 (e.g., with coatings, sprays, paints, portions thereof, combinations thereof, and/or the like). In some embodiments, loading of waste material(s) 17 into human-made cavern 14 may be facilitated by one or more of drilling rig 1, surface facilities 2, pumping means 2b, portions thereof, combinations thereof, and/or the like. In some embodiments, for waste material(s) 17 to reach human-made cavern 14, waste material(s) 17 may pass through vertical wellbore 5. In some embodiments, at least some portions of vertical wellbore 5 may be lined with casing(s), pipes, cement, portions thereof, combinations thereof, and/or the like.

Continuing discussing FIG. 4, in some embodiments, vertical wellbore 5 may be attached to and in fluid communication with launch chamber 7 and with terrestrial surface-level 3. In some embodiments, launch chamber 7 may be attached to and in fluid communication with vertical wellbore 5 and with human-made cavern 14. In some embodiments, human-made cavern 14 may be attached to and in fluid communication with launch chamber 7.

Continuing discussing FIG. 4, in some embodiments, after a given human-made cavern 14 may have been filled with waste material(s) 17 to a predetermined level/quantity, human-made cavern 14, launch chamber 7, vertical wellbore 5, portions thereof, combinations thereof, and/or the like, may be at least partially sealed/closed (e.g., with cement plugs and/or the like). In some embodiments, after a given human-made cavern 14 may have been filled with waste material(s) 17 to a predetermined level/quantity, human-made cavern 14, launch chamber 7, vertical wellbore 5, portions thereof, combinations thereof, and/or the like, may be completely sealed/closed (e.g., with cement plugs and/or the like).

Continuing discussing FIG. 4, in some embodiments, prior to sealing/closing human-made cavern 14, launch chamber 7, and/or vertical wellbore 5, a protective medium blanket may be inserted into human-made cavern 14. In some embodiments, this protective medium blanket may be substantially on top of waste material(s) 17 within human-made cavern 14.

Figure 5:
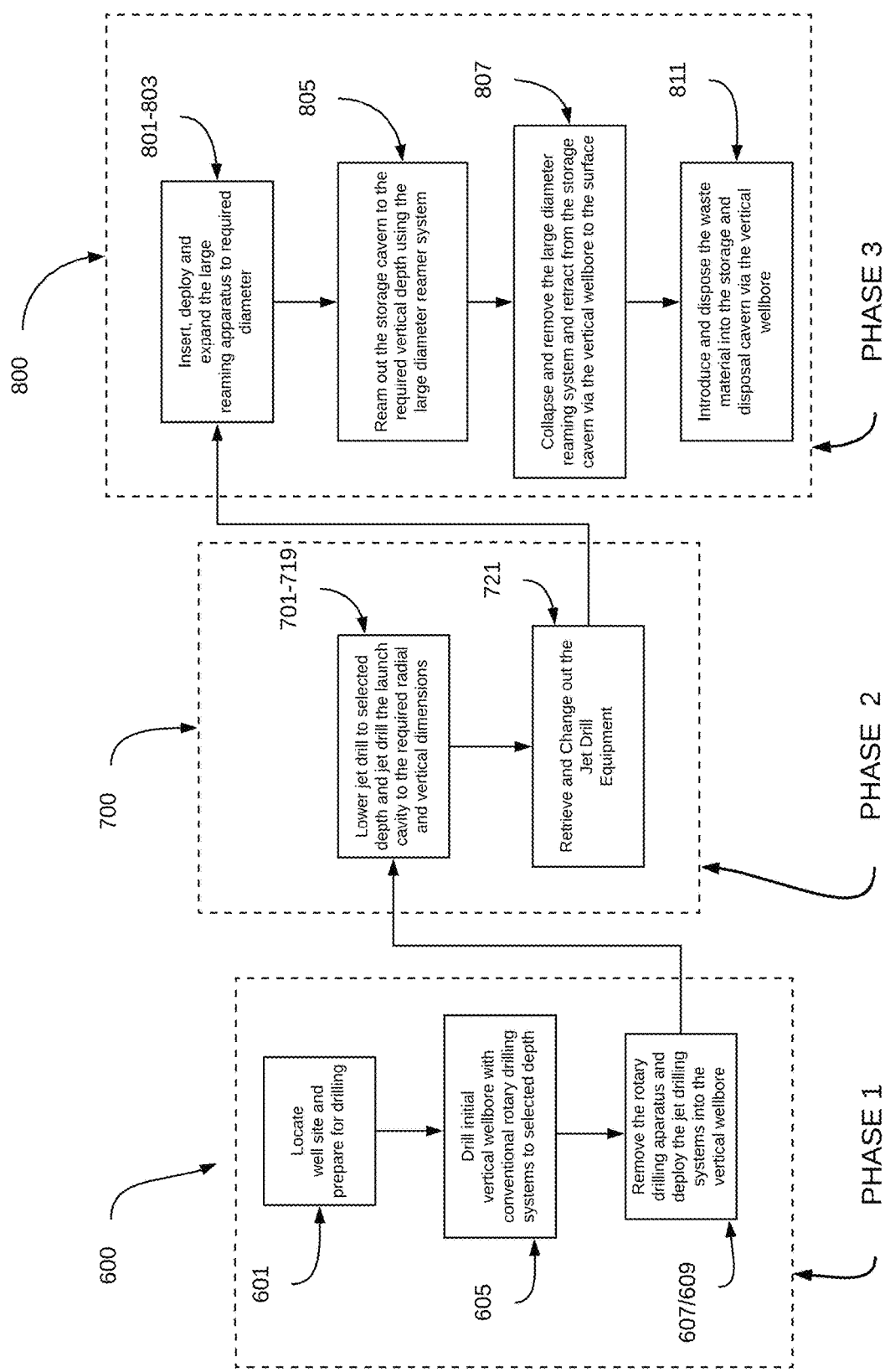
FIG. 5 may show a flow chart summarizing how three methods (phases) described herein may relate and/or interact with each other.

FIG. 5 may show a flow chart summarizing how three methods (phases) described herein may relate and/or interact with each other. FIG. 5 may show a flow chart summarizing how method 600 (phase 1) flows into method 700 (phase 2) and how method 700 flows into method 800 (phase 3). In some embodiments, method 600 may be a method of forming the initial/pilot vertical wellbore 5, see e.g., FIG. 1A to FIG. 4 and see FIG. 6. In some embodiments, method 700 may be a method of jet drilling to form a given launch chamber 7 at a bottom of the vertical wellbore 5, see e.g., FIG. 1A to FIG. 1H and see FIG. 7. In some embodiments, method 800 may be a method of forming a given human-made cavern 14 and/or of using that formed human-made cavern 14 for the long-term disposal and/or storage of waste-material(s) 17, see e.g., FIG. 3A to FIG. 4 and see FIG. 8.

Continuing discussing FIG. 5, in some embodiments, with respect to a single human-made cavern 14 to be formed, method 600 (phase 1) may come first and upon completion, method 600 may transition into method 700 (phase 2); wherein upon completion of method 700, method 700 may transition into method 800 (phase 3); wherein method 800 may then be executed.

Figure 6:
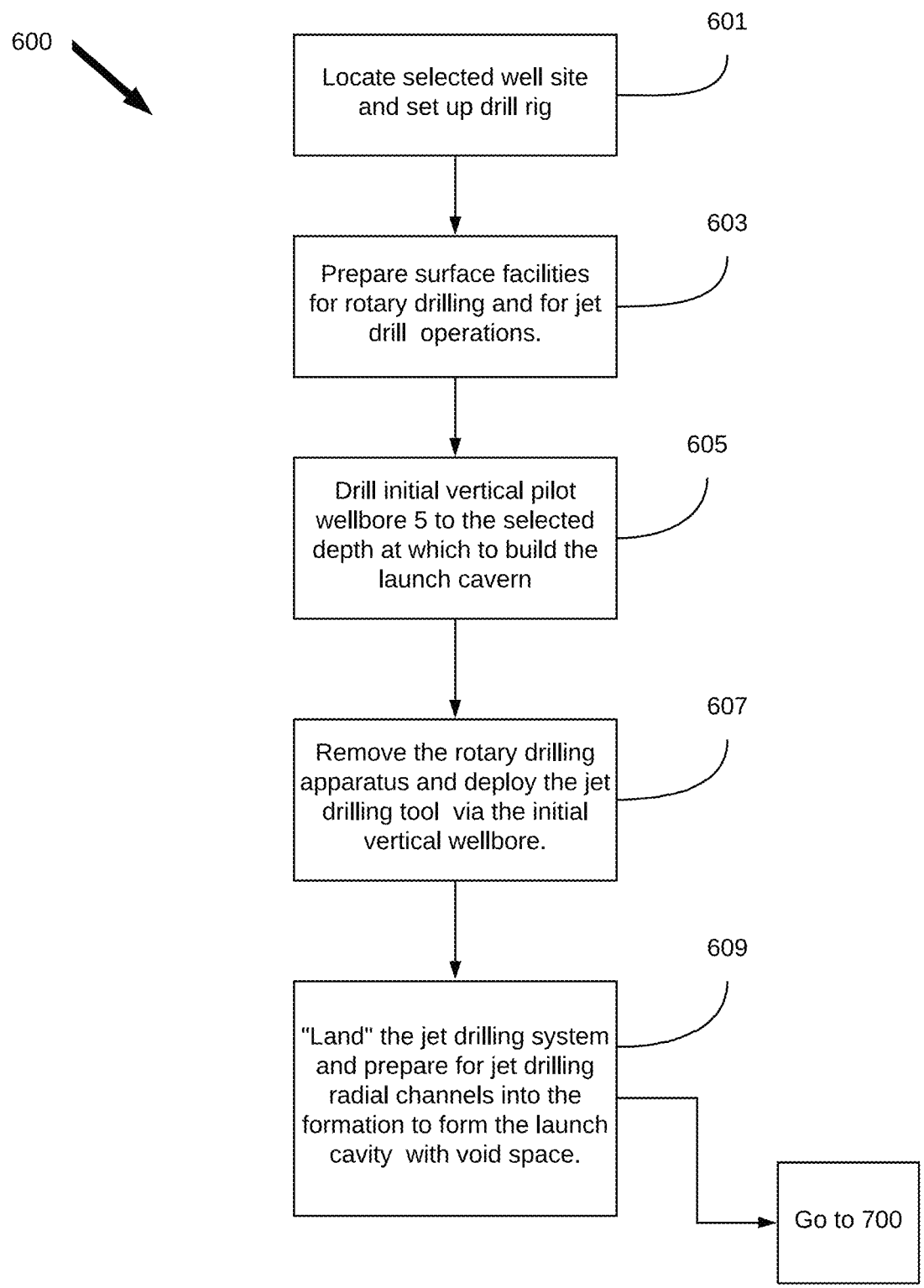
FIG. 6 may show at least some steps in a method for forming an initial vertical (pilot) wellbore.

FIG. 6 may show at least some steps in a method 600 for forming an initial vertical (pilot) wellbore 5. In some embodiments, method 600 may be considered phase 1 of the operations. In some embodiments, method 600 may be a method of locating and drilling with standard rotary drilling tools, an initial/pilot substantially vertical wellbore 5 from terrestrial surface-level 3 to a predetermined/designed depth, for eventual formation of a given launch chamber 7. In some embodiments, method 600 may comprise one or more steps of: 601, 603, 605, 607, and/or 609. In some embodiments, some steps of method 600 may occur in non-numeral order with respect to step reference numerals. In some embodiments, at least one six hundred series steps may be omitted from method 600.

Continuing discussing FIG. 6, in some embodiments, step 601 may be a step of one or more of: locating at least one site for wellbore 5 drilling; selecting at least one site for wellbore 5 drilling; setting up drilling rig 1 for wellbore 5 drilling at the at least one site; preparing for drilling operations at the at least one site; portions thereof; combinations thereof; and/or the like. In some embodiments, the site may need to be located substantially vertically above at least one disposal formation rock 15. In some embodiments, completion of step 601 may cause method 600 to transition into step 603. In some embodiments, completion of step 601 may cause method 600 to transition into step 605.

Continuing discussing FIG. 6, in some embodiments, step 603 may be a step of one or more of: preparing/installing surface facilities 2 for drilling and/or reaming operations; preparing/installing jet fluid supply (reservoir) 2a; preparing/installing pumping means 2b; preparing for drilling operations; preparing for jet drilling operations; portions thereof; combinations thereof; and/or the like. In some embodiments, completion of step 603 may cause method 600 to transition into step 605. In some embodiments, step 603 may occur after step 605. In some embodiments, completion of step 603 may cause method 600 to transition into step 607, if step 605 has already occurred.

Continuing discussing FIG. 6, in some embodiments, step 605 may be a step of drilling at least one substantially vertical pilot wellbore 5, using drilling rig 1, at the at least one site, that is located substantially vertically above at least one disposal formation rock 15. In some embodiments, step 605 may be drilling at least one substantially vertical pilot wellbore 5 to a predetermined depth. In some embodiments, step 605 may be drilling at least one substantially vertical pilot wellbore 5 to disposal formation rock 15. In some embodiments, step 605 may be drilling at least one substantially vertical pilot wellbore 5 into disposal formation rock 15. In some embodiments, the at least one substantially vertical wellbore 5 may have a diameter from ten (10) inches to thirty (30) inches plus or minus one inch; and a vertical depth between 2,000 feet and 25,000 feet, plus or minus 100 feet. In some embodiments, step 605 may utilize at least one rotary drill and/or drill pipe apparatus/tubulars 6b connected to the at least one rotary drill. In some embodiments, completion of step 605 may cause method 600 to transition into step 607.

Continuing discussing FIG. 6, in some embodiments, step 607 may be a step of one or more of: removing drilling equipment used to form the at least one substantially vertical pilot wellbore 5 from the at least one substantially vertical pilot wellbore 5; deploying jet drilling equipment (e.g., jetting tool 10, jet drill fluid pipe 9, and/or at least a portion of high-pressure conduit 6a) for jet drilling operation in a predetermined location within the at least one substantially vertical pilot wellbore 5; portions thereof; combinations thereof; and/or the like. In some embodiments, step 607 may comprise removing rotary drilling equipment from the at least one substantially vertical pilot wellbore 5. In some embodiments, step 607 may comprise removing drill pipe apparatus/tubulars 6b from the at least one substantially vertical pilot wellbore 5. In some embodiments, step 607 may comprise connecting jetting tool 10 to pumping means 2b and to jet fluid supply (reservoir) 2a via high-pressure conduit 6a. In some embodiments, completion of step 607 may cause method 600 to transition into step 609.

Continuing discussing FIG. 6, in some embodiments, step 609 may be a step of landing and/or fixing applicable/relevant jet drilling equipment (e.g., jetting tool 10, jet drill fluid pipe 9, and/or at least a portion of high-pressure conduit 6a) at the predetermined location (and/or portions leading up to the predetermined location) within the at least one substantially vertical pilot wellbore 5. In some embodiments, the predetermined location may be at a bottom of the at least one substantially vertical pilot wellbore 5. In some embodiments, the predetermined location may be at a distal/terminal portion of the at least one substantially vertical pilot wellbore 5. In some embodiments, completion of step 609 may cause method 600 to transition to method 700. In some embodiments, completion of step 609 may cause method 600 to transition to step 703.

Figure 7:
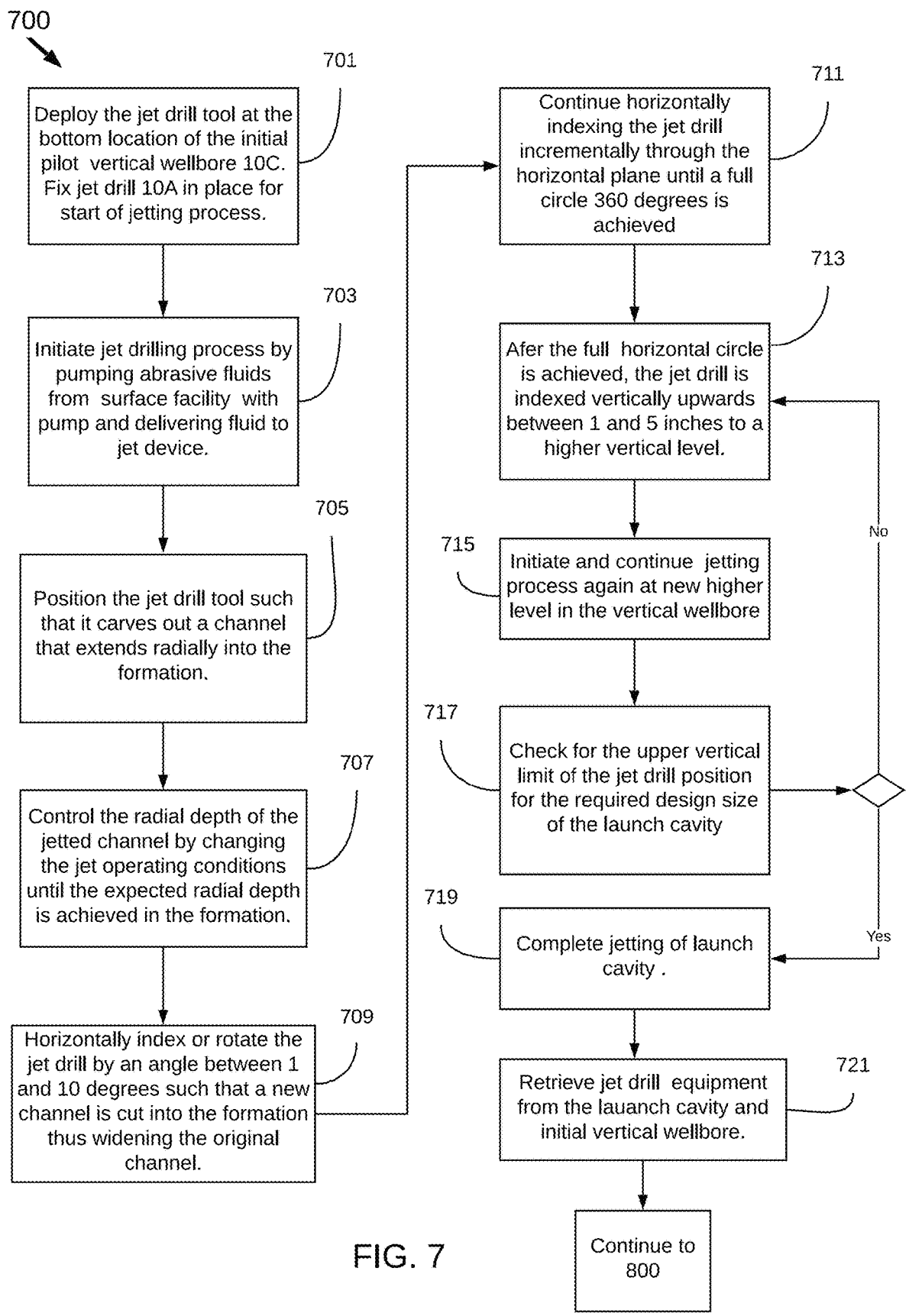
FIG. 7 may show at least some steps in a method for forming a launch chamber.

FIG. 7 may show at least some steps in a method 700 for forming a given launch chamber 7. For a given well site and/or for a given substantially vertical 5, method 700 may follow completion of method 600. In some embodiments, method 700 may be considered phase 2 of operations. In some embodiments, method 700 may be a method of jet drilling, eroding, and/or carving out a launch chamber 7 in disposal formation rock 15 with a specialized jet drilling equipment, that may comprise one or more of: jetting tool 10, jet drill fluid pipe 9, high-pressure conduit 6a, jet fluid supply (reservoir) 2a, pumping means 2b, the jetting fluid itself, portions thereof, combinations thereof, and/or the like. In some embodiments, method 700 may comprise one or more steps of: 701, 703, 705, 707, 709, 711, 713, 715, 717, and/or 719. In some embodiments, some steps of method 700 may occur in non-numeral order with respect to step reference numerals. In some embodiments, at least one seven hundred series steps may be omitted from method 700.

Continuing discussing FIG. 7, in some embodiments, step 701 may be a step of preparing jetting tool 10 for jet drilling operation at the predetermined location within the at least one substantially vertical wellbore 5. In some embodiments, step 701 may be a step of fixing jetting tool 10 (for jet drilling operation) in place at the predetermined location within the at least one substantially vertical wellbore 5. In some embodiments, in step 701 jetting tool 10 may be deployed from the terrestrial surface-level 3 via the substantially vertical wellbore 5 to its designated vertical position, such as position 10b at the bottom of the substantially vertical wellbore 5; wherein once there, jetting tool 10 may be fixed in place such that jet fluid 11 may be directed at disposal formation rock 15 after traversing the internal curved pipe section of jet drill fluid pipe 9 which may convert the vertical jetting fluid flow to horizontal jet flow for cutting channels jetted 11a in disposal formation rock 15 on impact. In some embodiments, completion of step 701 may cause method 700 to transition into step 703.

Continuing discussing FIG. 7, in some embodiments, step 703 may be a step of initiating jet drilling operations at the predetermined location within the at least one substantially vertical wellbore 5. In some embodiments, in step 703 the jet drilling process may be initiated by pumping abrasive fluids from the surface facility 2 (e.g., jet fluid supply (reservoir) 2a), via the high-pressure conduit 6a using pumping means 2b and thus delivering the subject jetting fluid to jetting tool 10. In some embodiments, the jetting fluid may be pumped from jet fluid supply (reservoir) 2a, by pumping means 2b, through high-pressure conduit 6a and jet drill fluid pipe 9, to be ejected from an orifice/nozzle in jetting tool 10. In some embodiments, completion of step 703 may cause method 700 to transition into step 705.

Continuing discussing FIG. 7, in some embodiments, step 705 may be a step of positioning jetting tool 10 within the predetermined location within the at least one substantially vertical wellbore 5 for jet drilling operations into disposal formation rock 15. In some embodiments, step 705 may be a step of jet drilling, carving out an initial channel jetted 11a, in disposal formation rock 15. In some embodiments, the jetting fluid may be pumped from jet fluid supply (reservoir) 2a, by pumping means 2b, through high-pressure conduit 6a and jet drill fluid pipe 9, to be ejected from an orifice/nozzle in jetting tool 10 as jet flow 11 to form an initial channel jetted 11a in disposal formation rock 15. In some embodiments, step 705 may result in at least an initial channel jetted 11a in disposal formation rock 15. In some embodiments, initial channel jetted 11a may be extend substantially linearly into disposal formation rock 15. In some embodiments, completion of step 705 may cause method 700 to transition into step 707.

Continuing discussing FIG. 7, in some embodiments, step 707 may be a step of continued jet drilling until a channel jetted 11a into disposal formation rock 15 is carved out to a sufficient (predetermined) length into disposal formation rock 15. In some embodiments, step 707 may be a step of controlling the continued jet drilling until a channel jetted 11a into disposal formation rock 15 is carved out to a sufficient (predetermined) length into disposal formation rock 15. In some embodiments, in step 707 pressure of jet flow 11 may be varied to achieve channel jetted 11a of a sufficient length into disposal formation rock 15. In some embodiments, in step 707 jetting time of jet flow 11 may be varied to achieve channel jetted 11a of a sufficient length into disposal formation rock 15. In some embodiments, in step 707 a composition of the jetting fluid (e.g., abrasive additives mix) may be varied to achieve channel jetted 11a of a sufficient length into disposal formation rock 15. In some embodiments, completion of step 707 may cause method 700 to transition into step 709.

Continuing discussing FIG. 7, in some embodiments, step 709 may be a step of jet drilling after a rotationally indexed movement of jetting tool 10, within a given (substantially) horizontal plane. In some embodiments, each rotational indexed movement of jetting tool 10, within the given (substantially) horizontal plane, may be selected from a range of one (1) degree to ten (10) degrees, plus or minus one half (0.5) degree. In this new azimuth position, the jetting process is re-initiated and a new channel jetted 11a is carved out in disposal formation rock 15. See e.g., FIG. 1D and its discussion for such rotational indexing. In some embodiments, completion of step 709 may cause method 700 to transition into step 711.

Continuing discussing FIG. 7, in some embodiments, step 711 may be a step of continued jet drilling with rotational indexing and movement of jetting tool 10, carving out a disk/disc/circle of void space at a given height/depth, in disposal formation rock 15. In some embodiments, step 709 may entail rotational indexing of jetting tool 10 and forming a new channel jetted 11a after each indexed rotational move, wherein such rotational indexing and jet drilling may continue until jetting tool 10 has been rotationally indexed for about 360 degrees, resulting in forming a region of void space that is substantially circular in shape. In some embodiments, step 709 may entail rotational indexing of jetting tool 10 and forming a new channel jetted 11a after each indexed rotational move, wherein such rotational indexing and jet drilling may continue until all those carved channels jetted 11a now form a region of void space that is substantially circular in shape. See e.g., FIG. 1D and its discussion for such rotational indexing. In some embodiments, if the jet drilling system is sufficiently robust and sophisticated and disposal formation rock 15 is of suitable petrophysical and rock properties, this horizontal and rotational indexing process may be a substantially continuous process such that the indexing is continuously performed until the full circular void shaped may be carved out, at that particular horizontal plane height/position. In some embodiments, completion of step 711 may cause method 700 to transition into step 713.

Continuing discussing FIG. 7, in some embodiments, step 713 may be a step of vertically indexed movement of jetting tool 10, within a given (substantially) vertical plane. In some embodiments, each vertical indexed movement of jetting tool 10, within the given (substantially) vertical plane, may be substantially vertically upwards movement of jetting tool 10. In some embodiments, jetting tool 10 may be moved vertically upwards by an amount selected from a range of one (1) inch to six (6) inches, plus or minus one half (0.5) inch for each such vertically indexed upwards movements. It is noted that vertical indexing as shown in FIG. 1E may be implemented from a lower depth position 10*b* to a higher depth position 10*a*. See e.g., FIG. 1E and its discussion for such vertical indexing. In some embodiments, completion of step 713 may cause method 700 to transition into step 715.

Continuing discussing FIG. 7, in some embodiments, step 715 may be a step of repeating steps 707 through 711 at the latest vertically indexed height/position of jetting tool 10, so that a new substantially circle shaped region of void space is formed in disposal formation rock 15 at that latest height/position of jetting tool 10. In some embodiments, after steps 707 through 711 are completed for the given level/height of jetting tool 10, step 715 may further comprise repeating step 713 to raise jetting tool 10 to yet another vertically upwards indexed position/height. That is, step 715 may be iterative in nature and may result in a region of void space in disposal formation rock 15 that may be substantially cylindrical in shape. That is, step 715 may be iterative in nature and may result in a region of void space in disposal formation rock 15 that may be launch chamber 7 and/or volume 8. In some embodiments, before vertical indexing to a new height and then carving out a new circle of void space, step 715 may progress to step 717. In some embodiments, completion of step 715 may cause method 700 to transition into step 717.

Continuing discussing FIG. 7, in some embodiments, step 717 may be a step of checking whether prior jet drilling operational steps (e.g., steps 707-715) have resulted in a void space in disposal formation rock 15 that substantially matches with a predetermined dimensional size of the launch chamber 7 being built by method 700. In some embodiments, step 717 may be a step of checking whether prior jet drilling operational steps (e.g., steps 707-715) have resulted in a void space in disposal formation rock 15 that substantially matches with a predetermined vertical size dimension of the launch chamber 7 being built by method 700.

In some embodiments, with respect to step 717, if the carved void space from jetting operations substantially matches the predetermined dimensional size of launch chamber 7 and/or of volume 8, then the desired launch chamber 7 and/or of volume 8 may be completed and/or formed by method 700.

In some embodiments, with respect to step 717, if the carved void space from jetting operations substantially matches the predetermined dimensional size of launch chamber 7 and/or of volume 8, then step 717 may progress into step 719.

In some embodiments, with respect to step 717, if the carved void space from jetting operations substantially matches the predetermined dimensional size of launch chamber 7 and/or of volume 8, then step 717 may progress into step 721. With respect to step 717 progressing to step 721 and not step 719, progression from step 717 to step 721, may occur when not further finishing actions are needed nor desired for launch chamber 7 and/or volume 8; whereas, if some finishing actions are needed or desired with respect to launch chamber 7 and/or volume 8, then step 717 may progress to step 719.

In some embodiments, with respect to step 717, if the carved void space from jetting operations does not substantially match the predetermined dimensional size of launch chamber 7 and/or of volume 8, then step 717 may progress back to step 713.

Continuing discussing FIG. 7, in some embodiments, step 719 may be a step of finishing/completing a given launch chamber 7 and/or volume 8. In some embodiments, step 719 may entail some jet drilling operations within launch chamber 7 to make sure the predetermined dimensions of launch chamber 7 and/or volume 8 are at least met, i.e., rough spots and/or harder/denser projections into launch chamber 7 and/or volume 8 may be removed with some additional jet drilling operations. In some embodiments, launch chamber 7 and/or volume 8 may be complete when a given reaming tool 12 may be lowered into launch chamber 7 and/or volume 8 and that given reaming tool 12 may articulated from its closed configuration to its open configuration and vice versa without obstructions from rock walls of launch chamber 7 and/or volume 8. In some embodiments, completion of step 719 may cause method 700 to transition into step 721.

Continuing discussing FIG. 7, in some embodiments, step 721 may be a step of retrieving the jetting drilling equipment from the newly formed launch chamber 7, volume 8, substantially vertical wellbore 5, portions thereof, combinations thereof, and/or the like. In some embodiments, step 721 may be a step of retrieving jetting tool 10, jet drill fluid pipe 9, and/or high-pressure conduit 6*a* from the newly formed launch chamber 7, volume 8, substantially vertical wellbore 5, portions thereof, combinations thereof, and/or the like. In some embodiments, completion of step 721 may cause method 700 to transition to method 800.

In some embodiments, the jet drilling operations of method 700 may be executed substantially continuously until a given horizontal circular void shape may be carved out from disposal formation rock 15 at a given depth in disposal formation rock 15. In some embodiments, the jet drilling operations of method 700 may be executed by rotating and elevating the jetting tool 10 in substantially continuous incremental motions, in a "rotate and elevate" fashion until the given launch chamber 7 may be formed.

Figure 8:
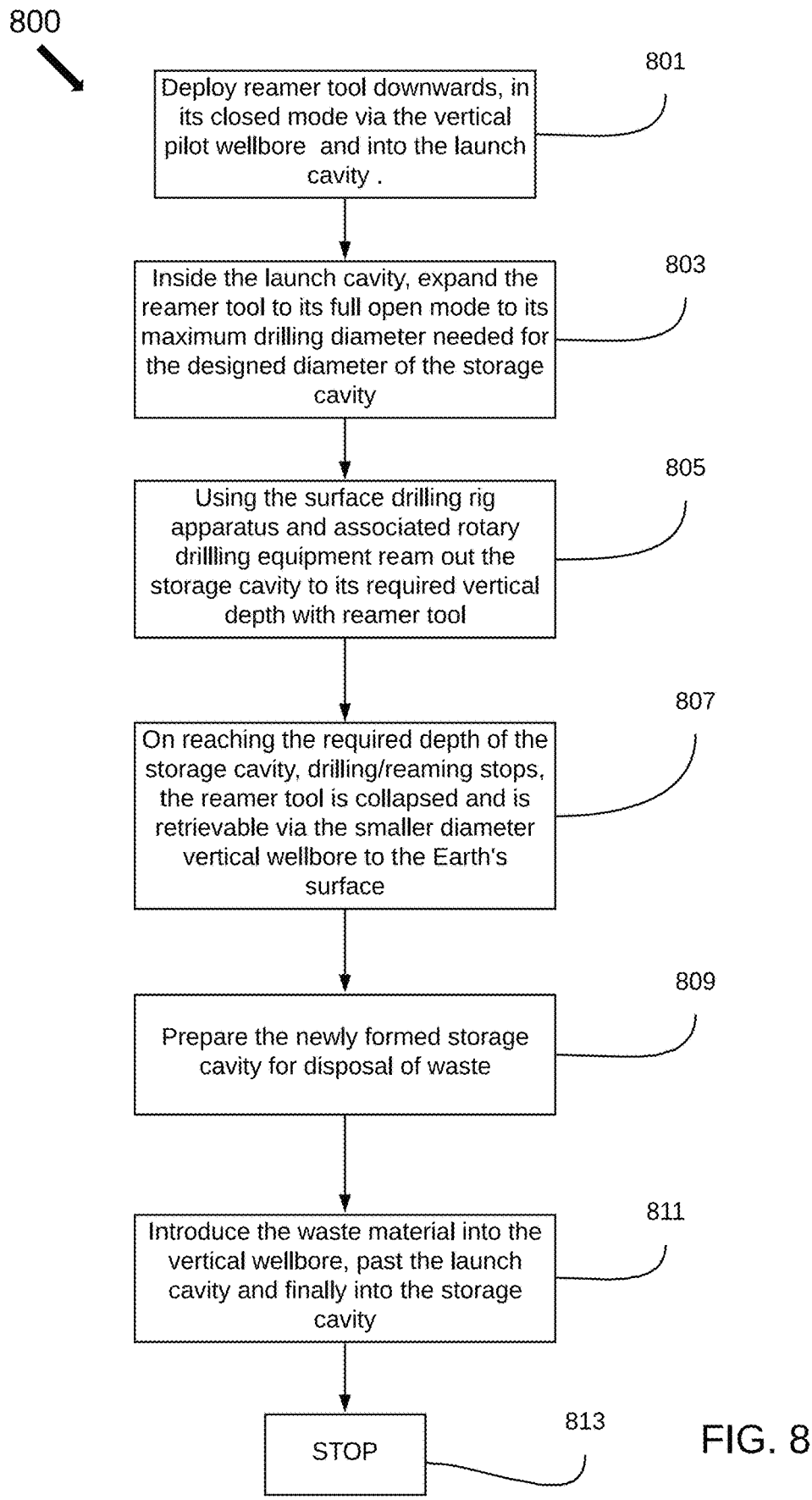
FIG. 8 may show at least some steps in a method for forming a human-made cavern and then using that human-made cavern as disposal location for waste material.

FIG. 8 may show at least some steps in a method 800 for forming a human-made cavern 14 and/or then using that human-made cavern 14 as disposal location for waste material(s) 17. In some embodiments, method 800 may be considered phase 3 of operations. In some embodiments, method 800 may be a method of large diameter reaming to construct a human-made cavern 14 for waste material(s) 17 disposal/storage using industry type rotary under-reaming equipment. In some embodiments, method 800 may comprise one or more steps of: 801, 803, 805, 807, 809, 811, and/or 813. In some embodiments, some steps of method 800 may occur in non-numeral order with respect to step reference numerals. In some embodiments, at least one seven hundred series steps may be omitted from method 800.

Continuing discussing FIG. 8, in some embodiments, step 801 may be a step of deploying, placing, locating, and/or landing a given reaming tool 12 into a volume 8 of a given launch chamber 7. In order to accomplish this, reaming tool 12 may be in its substantially closed configuration, wherein reaming tool 12 may be located into wellbore 5 that connects to launch chamber 7, then using drilling rig 1 and drill pipe apparatus 6*b*, reaming tool 12 may be lowered down into launch chamber 7 through that connecting wellbore 5. In some embodiments, completion of step 801 may cause method 800 to transition into step 803.

Continuing discussing FIG. 8, in some embodiments, step 803 may be a step of expanding/opening reaming tool 12 into its substantially open configuration. In some embodiments, this expansion process may involve movement of the closed arms 12*a* in an outward direction (e.g., outward direction 16) which may result in cutting arms 13 shown in FIG. 2 and in FIG. 3B to be extended to their fullest extent.

In some embodiments, completion of step 803 may cause method 800 to transition into step 805.

Continuing discussing FIG. 8, in some embodiments, step 805 may be a step of under-reaming out portions of disposal formation rock 15, using reaming tool 12 in its fully open configuration, to a predetermined depth vertically below launch chamber 7 to form the given human-made cavern 14. In some embodiments, a given human-made cavern 14 size may be from 1,000 feet to 10,000 feet or more in a vertical linear direction. In some embodiments, completion of step 805 may cause method 800 to transition into step 807.

Continuing discussing FIG. 8, in some embodiments, step 807 may be a step of retrieving the reaming equipment out from human-made cavern 14, launch chamber 7, the connected wellbore 5, portions thereof, combinations thereof, and/or the like. In some embodiments, step 807 may be a step of retrieving reaming tool 12 and/or drill pipe apparatus/tubulars 6b portions out from human-made cavern 14, launch chamber 7, the connected wellbore 5, portions thereof, combinations thereof, and/or the like. In some embodiments, in order to accomplish such retrieval, reaming tool 12 may be first stopped and then collapsed into its substantially/fully closed configuration. In some embodiments, completion of step 807 may cause method 800 to transition into step 809. In some embodiments, completion of step 807 may cause method 800 to transition into step 811.

Continuing discussing FIG. 8, in some embodiments, step 809 may be a step of conditioning and/or treating at least some interior surfaces of a given human-made cavern 14 before that 14 receives waste material(s) 17. In some embodiments, this may entail, applying, lining, spraying, painting, at least some interior surfaces of a given human-made cavern 14 with one or more predetermined treatments/conditioners. In some embodiments, step 809 may entail lining at least some interior portion of a given wellbore 5 that connects to a given human-made cavern 14, wherein this lining may be of piping, steel, cement, portions thereof, combinations thereof, and/or the like. In some embodiments, completion of step 809 may cause method 800 to transition into step 811.

Continuing discussing FIG. 8, in some embodiments, step 811 may be a step of loading at least some quantity of waste material(s) 17 into a given human-made cavern 14. In some embodiments, step 811 may be facilitated by using drilling rig 1 (or the like) and pumping means 2b (or the like) to pump and/or transport the at least some quantity of waste material(s) 17 through connected wellbore 5 and into human-made cavern 14. In some embodiments, drilling rig 1 (or the like) may have radiation shielding installed thereon. In some embodiments, completion of step 811 may cause method 800 to transition into step 813.

Continuing discussing FIG. 8, in some embodiments, step 813 may be a step of stopping/ending method 800. In some embodiments, step 813 may entail closing and/or sealing at least some portion of human-made cavern 14, launch chamber 7, connected wellbore 5, portions thereof, combinations thereof, and/or the like, with one or more plugs. In some embodiments, the one or more plugs may be substantially constructed from a predetermined concrete and/or cement.

Some embodiments of the present invention may be characterized as a method for disposing of waste 17 within at least one human-made cavern 14. In some embodiments, such a method may comprise steps of: step (a); step (b); step (c); step (d); step (e); and step (f); wherein these steps are noted below.

In some embodiments, the step (a) may be a step of drilling at least one wellbore 5 from a drill site located on a terrestrial surface 3, wherein the at least one wellbore may be substantially vertical and drilled out to at least a predetermined depth. See e.g., method 600, such as step 605. In some embodiments, the step (a) may be at least partially accomplished by using at least one drilling rig 1 located on the terrestrial surface 3 and using rotary oilwell drilling equipment, wherein at least a portion of the rotary oilwell drilling equipment may be operatively connected to the at least one drilling rig 1. See e.g., method 600. In some embodiments, the predetermined depth may be at least to a top boundary of the deep geological formation 15, wherein the deep geological formation 15 may be located substantially vertically below the drill site. In some embodiments, this drilling of the step (a) may be at least partially into the deep geological formation 15. See e.g., method 600.

In some embodiments, the step (b) may be a step of inserting at least one jetting tool 10 within the at least one wellbore 5 to a predetermined location. See e.g., method 700, such as step 701. In some embodiments, the predetermined location within the at least one wellbore 5 may be at a distal bottom of the at least one wellbore 5, disposed away from the drill site.

In some embodiments, the step (c) may be a step of jet drilling into a geological formation that axially surrounds a portion of the at least one wellbore 5 using the at least one jetting tool 10 to form a launch chamber 7 of a volume 8 of void space within the geological formation. See e.g., method 700, such as steps 707 to 715. In some embodiments, the step (c) may be done by rotational indexing and by vertical indexing of the at least one jetting tool 10 within the at least one wellbore 5; wherein the rotational indexing at a horizontal location within the at least one wellbore 5 may result in formation of a void region that is substantially circular and horizontal (see e.g., method 700, such as steps 709 and 711); wherein the vertical indexing raises the at least one jetting tool to a different vertical location within the at least one wellbore 5 (see e.g., method 700, such as steps 709 and 711).

In some embodiments, the geological formation (that axially surround bottom/distal/terminal portions of wellbore 5 and/or that axially surrounds a given launch chamber 7) and the deep geological formation 15 may be a same formation. In some embodiments, the geological formation (that axially surround bottom/distal/terminal portions of wellbore 5 and/or that axially surrounds a given launch chamber 7) and the deep geological formation 15 may not be a same formation.

In some embodiments, volume 8 of a given launch chamber 7 may have a predetermined diameter that is larger than a largest dimension of the at least one reaming tool 12, when the at least one reaming tool 12 is in an open configuration.

In some embodiments, prior to the step (d), the method may comprise a step of removing the at least one jetting tool 10 from the launch chamber 7 and from the at least one wellbore 5. See e.g., method 700, such as step 719.

In some embodiments, the step (d) may be a step of landing at least one reaming tool 12 within the launch chamber 7. See e.g., method 800, such as step 801. In some embodiments, the step (d) may occur while the at least one reaming tool 12 may be in a closed configuration having a smaller diameter that is smaller than a larger diameter of the at least one reaming tool 12 when the at least one reaming tool is in an open configuration. See e.g., method 800, such as step 801.

In some embodiments, after the step (d) but before the step (e), the at least one reamer tool 12 may be transitioned from a closed configuration to an open configuration. See e.g., method 800, such as step 803.

In some embodiments, the step (e) may be a step of reaming portions of a deep geological formation 15 that are located below the launch chamber 7 to form the at least one human-made cavern 14. See e.g., method 800, such as step 805.

In some embodiments, the step (f) may be a step of inserting at least some of the waste 17 into the at least one human-made cavern 14. See e.g., method 800, such as step 811.

In some embodiments, prior to the step (f), the method may comprise a step of removing the at least one reaming tool from 12: the at least one human-made cavern 14, the launch chamber 7, and the at least one wellbore 5. See e.g., method 800, such as step 807.

In some embodiments, prior to the step (f), the method may comprise a step of conditioning at least some of interior surfaces of the at least one human-made cavern 14 for receiving the at least some of the waste 17. See e.g., method 800, such as step 809.

In some embodiments, after the step (f), the method may comprise a step of sealing off (closing) one or more of: the at least one human-made cavern 14, the launch chamber 7, or the at least one wellbore 5. See e.g., method 800, such as step 813.

Some embodiments of the present invention may be characterized as a method for constructing at least one human-made cavern 14 by forming a launch chamber 7 to facilitate reaming tool 12 transitions. In some embodiments, such a method may comprise steps of: the step (a); the step (b); the step (c); the step (d); and the step (e).

Systems and methods for human-made cavern construction for use in waste disposal have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method for disposing of waste within at least one human-made cavern, wherein the method comprises steps of:
    (a) drilling at least one wellbore from a drill site located on a terrestrial surface, wherein the at least one wellbore is substantially vertical and drilled out to at least a predetermined depth;
    (b) inserting at least one jetting tool within the at least one wellbore to a predetermined location;
    (c) jet drilling into a geological formation that axially surrounds a portion of the at least one wellbore using the at least one jetting tool to form a launch chamber of a volume of void space within the geological formation;
    (d) landing at least one reaming tool within the launch chamber;
    (e) reaming portions of a deep geological formation that are located below the launch chamber to form the at least one human-made cavern; and
    (f) inserting at least some of the waste into the at least one human-made cavern.

2. The method according to claim 1, wherein the waste is selected from one or more of: nuclear waste, radioactive waste, high-level nuclear waste, spent nuclear fuel, weapons grade plutonium, uranium-based waste products, depleted uranium products, depleted uranium penetrators, uranium hexafluoride, portions thereof, or combinations thereof.

3. The method according to claim 1, wherein the waste is in one or more formats of: solid, liquid, liquified, slurry, pellet, powder, brick, spherical, ball, gel, rod, cylindrical, briquette, foam, portions thereof, or combinations thereof.

4. The method according to claim 1, wherein the at least one human-made cavern has a fixed diameter that is selected from a range of three (3) feet to ten (10) feet, plus or minus one (1) foot.

5. The method according to claim 1, wherein the at least one human-made cavern has a fixed length that extends into the deep geological formation, wherein the fixed length is selected from a range of 1,000 feet to 10,000 feet, plus or minus one hundred (100) foot.

6. The method according to claim 1, wherein the at least one human-made cavern is substantially surrounded by the deep geological formation.

7. The method according to claim 1, wherein prior to the step (0, the method further comprises a step of conditioning at least some of interior surfaces of the at least one human-made cavern for receiving the at least some of the waste.

8. The method according to claim 1, wherein the step (a) is at least partially accomplished by using at least one drilling rig located on the terrestrial surface and using rotary oilwell drilling equipment, wherein at least a portion of the rotary oilwell drilling equipment is operatively connected to the at least one drilling rig.

9. The method according to claim 1, wherein the predetermined depth is at least to a top boundary of the deep geological formation, wherein the deep geological formation is located substantially vertically below the drill site.

10. The method according to claim 1, wherein the deep geological formation is located substantially from 2,000 feet to 30,000 feet, plus or minus 1,000 feet, substantially vertically below the drill site.

11. The method according to claim 1, wherein the at least one jetting tool is connected to at least one high-pressure conduit, wherein the at least one high-pressure conduit runs from the at least one jetting tool to the terrestrial surface, with portions of the at least one high-pressure conduit passing through the at least one wellbore to a pumping means; wherein by use of the pumping means, the at least one high-pressure conduit is configured to transport a jetting fluid, under high-pressure, from a jetting fluid reservoir to the at least one jetting tool, wherein the jetting fluid reservoir is operatively connected to the pumping means.

12. The method according to claim 11, wherein jetting fluid comprises at least one abrasive additive, wherein the jetting fluid is configured to assist with mechanical and/or chemical erosion of regions of the geological formation that come into contact with the jetting fluid when the jetting fluid is under high-pressure.

13. The method according to claim 1, wherein the at least one jetting tool comprises at least one nozzle that is configured to deliver a jetting fluid at pressure towards regions of the geological formation resulting in erosion of at least some of those regions of the geological formation.

14. The method according to claim 1, wherein the geological formation and the deep geological formation are a same formation.

15. The method according to claim 1, wherein the predetermined location within the at least one wellbore is at a distal bottom of the at least one wellbore, disposed away from the drill site.

16. The method according to claim 1, wherein the volume of the launch chamber is substantially shaped as a cylinder.

17. The method according to claim 1, wherein the step (c) is done by rotational indexing and by vertical indexing of the at least one jetting tool within the at least one wellbore; wherein the rotational indexing at a horizontal location within the at least one wellbore results in formation of a void region that is substantially circular and horizontal; wherein the vertical indexing raises the at least one jetting tool to a different vertical location within the at least one wellbore.

18. The method according to claim 1, wherein the volume of the launch chamber has a predetermined diameter that is larger than a largest dimension of the at least one reaming tool, when the at least one reaming tool is in an open configuration.

19. The method according to claim 1, wherein prior to the step (d), the method further comprises a step of removing the at least one jetting tool from the launch chamber and from the at least one wellbore.

20. The method according to claim 1, wherein the step (d) occurs while the at least one reaming tool is in a closed configuration having a smaller diameter that is smaller than a larger diameter of the at least one reaming tool when the at least one reaming tool is in an open configuration.

21. The method according to claim 1, wherein after the step (d) but before the step (e) the at least one reaming tool is transitioned from a closed configuration to an open configuration.

22. The method according to claim 1, wherein prior to the step (0, the method further comprises a step of removing the at least one reaming tool from: the at least one human-made cavern, the launch chamber, and the at least one wellbore.

23. The method according to claim 1, wherein after the step (f), the method further comprises a step of sealing off one or more of: the at least one human-made cavern, the launch chamber, or the at least one wellbore.

* * * * *